US011282290B1

(12) United States Patent  
Peng et al.

(10) Patent No.: US 11,282,290 B1  
(45) Date of Patent: Mar. 22, 2022

(54) GENERATING SUGGESTED EDITS FOR THREE-DIMENSIONAL GRAPHICS BASED ON DEFORMATIONS OF PRIOR EDITS

(71) Applicant: Adobe Inc., San Jose, CA (US)

(72) Inventors: Mengqi Peng, Shenzhen (CN); Vladimir Kim, Seattle, WA (US); Li-Yi Wei, Redwood City, CA (US); Kazi Rubaiat Habib, Seattle, WA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/953,227

(22) Filed: Nov. 19, 2020

(51) Int. Cl.
*G06T 19/20* (2011.01)
*G06T 17/20* (2006.01)

(52) U.S. Cl.
CPC .............. *G06T 19/20* (2013.01); *G06T 17/20* (2013.01); *G06T 2219/2016* (2013.01); *G06T 2219/2021* (2013.01)

(58) Field of Classification Search
CPC ...................... G06T 19/20; G06T 17/20; G06T 2219/2021
See application file for complete search history.

(56) References Cited

U.S. PATENT DOCUMENTS

2011/0142308 A1* 6/2011 Ishikawa ............... G06T 3/0093
  382/128
2015/0269291 A1* 9/2015 Sekine .................... G06T 13/40
  703/1

OTHER PUBLICATIONS

3D Computer Animation, Modeling, Simulation, and Rendering Software, AutoDesk, Maya Software, Available Online at: https://www.autodesk.com/products/maya/overview, 2019, 12 pages.
3D Modeling and Rendering Software for Design Visualization, Games, and Animation, AutoDesk, 3dsMax, Available Online at: https://www.autodesk.com.hk/products/3ds-max/overview, 2019, 11 pages.
Denning, et al., 3DFlow: Continuous Summarization of Mesh Editing Workflows ACM Transactions on Graphics (TOG), vol. 34, No. 4, Article 140, Aug. 2015, 10 pages.

(Continued)

*Primary Examiner* — Samantha (Yuehan) Wang
(74) *Attorney, Agent, or Firm* — Kilpatrick Townsend & Stockton LLP

(57) ABSTRACT

Using a prediction engine, generating, based on deformations of prior editing operations performed with a graphics editing tool, suggested editing operations that augment current editing operations applied to a graphical object. The prediction engine accesses first samples defining first positions along first paths of previous editing operations applied to a mesh object in a previous frame and second samples defining second positions along second paths of executed editing operations applied in a current frame. The prediction engine identifies, from a comparison of the first samples and the second samples, a matching component set from the previous editing operations that corresponds to the executed editing operations. The prediction engine deforms the first samples toward the second samples and determines suggested editing operations that comprise a non-matching component set as modified based on the deformed first samples. The prediction engine updates an interface to provide the suggested editing operations.

20 Claims, 7 Drawing Sheets

(56) References Cited

OTHER PUBLICATIONS

Davis, et al., A Sketching Interface for Articulated Figure Animation, Proceedings of the Association for Computing Machinery SIGGRAPH/Eurographics Symposium on Computer Animation, Available Online at: http://dl.acm.org/citation.cfm?id=846276.846322, Jul. 2003, pp. 320-328.

Chanatry, Adaptive UI in NX, Siemens, Available Online at: https://blogs.sw.siemens.com/nx-design/New-Adaptive-UI/, Feb. 18, 2019, 2 pages.

Peng, Autocomplete 3D Sculpting, ACM Transactions on Graphics, vol. 37, No. 4, Mar. 30, 2017, 10 pages.

Xing, et al., Autocomplete Hand-Drawn Animations, Association for Computing Machinery Transactions on Graphics, vol. 34, No. 6 Article No. 169, Nov. 2015, 11 pages.

Xing, et al., Autocomplete Painting Repetitions, Association for Computing Machinery Transactions on Graphics, vol. 33, No. 6, Article 172, Available Online at: http://dx.doi.org/10.1145/2661229.2661247, Nov. 2014, 11 pages.

Whited, et al., BetweenIT: an Interactive Tool for Tight Inbetweening, Computer Graphics Forum, vol. 29, No. 2, Available Online at: http://dx.doi.org/10.1111/j.1467-8659.2009.01630.x, Jun. 7, 2010, 10 pages.

Blender Foundation Blender, Available Online at: https://www.blender.org/, 2019, 23 pages.

ChronoSculpt: Time Based Cache Sculpting for all 3D Software Pipelines, New Tek LightWave, Available Online at: https://www.lightwave3d.com/chronosculpt/, 2019, 6 pages.

Create 3D Digital Designs with Online CAD, Autodesk,TinkerCAD, Available Online at: https://www.tinkercad.com, Accessed Online on Nov. 5, 2020, 8 pages.

Calabrese, et al. cSculpt: A System for Collaborative Sculpting, Association for Computing Machinery Transactions on Graphics, vol. 35, No. 4, Article 91, Available Online at: http://dx.doi.org/10.1145/2897824.2925956, Jul. 2016, pp. 91:1-91:8.

Chen, et al., Data-driven Adaptive History for Image Editing Proceedings of the 20th Association for Computing Machinery SIGGRAPH Symposium on Interactive 3D Graphics and Games, Available Online at: http://dx.doi.org/10.1145/2856400.2856417, Feb. 2016, pp. 103-111.

Kim, et al., Direct Control of Simulated Non-Human Characters, IEEE Computer Graphics and Applications, vol. 31, No. 4, 2011, pp. 56-65.

Ma, et al. Discrete Element Textures, ACM Transactions on Graphics (TOG), vol. 30, Jul. 2011, 10 pages.

Kazi, et al., Draco: Bringing Life to Illustrations with Kinetic Textures, In CHI '14, Available Online at: http://dx.doi.org/10.1145/2556288.2556987, 2014, pp. 351-360.

Matsui, et al., DrawFromDrawings: 2D Drawing Assistance via Stroke Interpolation with a Sketch Database IEEE Transactions on Visualization and Computer Graphics, vol. 23, No. 7, Jul. 2017, pp. 1852-1862.

Sumner, et al., Embedded Deformation for Shape Manipulation, Association for Computing Machinery Transactions on Graphics ,vol. 26, No. 3, Article No. 80, Available Online at: http://dx.doi.org/10.1145/1275808.1276478, Jul. 2007, 7 pages.

Arora, et al., Experimental Evaluation of Sketching on Surfaces in VR, In CHI, Available Online at: http://dx.doi.org/10.1145/3025453.3025474, May 2017, 12 pages.

Sederberg, et al., Free-form Deformation of Solid Geometric Models, ACM SIGGRAPH Computer Graphics, vol. 20, No. 4, Aug. 18-22, 1986, pp. 151-160.

Zaman, et al., GEM-NI: A System for Creating and Managing Alternatives in Generative Design, Proceedings of the 33rd Annual ACM Conference on Human Factors in Computing Systems, Available Online at: http://dx.doi.org/10.1145/2702123.2702398, Apr. 2015, pp. 1201-1210.

Li, et al., Global Correspondence Optimization for Non-Rigid Registration of Depth Scans, In Proceedings of the Symposium on Geometry Processing (SGP '08), Eurographics Association, Airela-Ville, Switzerland, vol. 27, No. 5, Available Online at: http://dl.acm.org/citation.cfm?id=1731309.1731326pp. 1421-1430, 2008.

Xing, et al., HairBrush for Immersive Data-Driven Hair Modeling, Proceedings of the 32nd Annual Association for Computing Machinery Symposium on User Interface Software and Technology, Available Online at: http://dx.doi.org/10.1145/3332165.3347876, Oct. 20-23, 2019, pp. 263-279.

Chen, et al., History Assisted View Authoring for 3D Models Proceedings of the SIGCHI Conference on Human Factors in Computing Systems, Session: 3D Interaction: Modeling and Prototyping, Available Online at: http://dx.doi.org/10.1145/2556288.2557009, Apr. 26-May 1, 2014, pp. 2027-2036.

Reeves, Inbetweening for Computer Animation Utilizing Moving Point Constraints, SIGGRAPH '81: Proceedings of the 8th Annual Conference on Computer Graphics and Interactive Techniques, vol. 15, No. 3, Aug. 1981, 7 pages.

Burtnyk, et al., Interactive Skeleton Techniques for Enhancing Motion Dynamics in Key Frame AnimationGraphics and Image Processing, Communications of the Association for Computing Machinery, vol. 19, No. 10, Oct. 1976, pp. 564-569.

Kazi, et al., Kitty: Sketching Dynamic and Interactive Illustrations, In UIST '14, Available Online at: http://dx.doi.org/10.1145/2642918.2647375, Oct. 5-8, 2014, pp. 395-405.

Arora, et al., MagicalHands: Mid-Air Hand Gestures for Animating in VR, Session 4A: VR Headsets, User Interface Software and Technology, Oct. 20-23, 2019, pp. 463-477.

Medium, Oculus, Available Online at: https://www.oculus.com/medium/7 pages, 2019.

Salvati, et al., MeshHisto: Collaborative Modeling by Sharing and Retargeting Editing Histories, ACM Transactions on Graphics, vol. 34, No. 6, Oct. 2015, pp. 1-10.

Fan, et al., Modeling by Drawing with Shadow Guidance, Computer Graphics Forum, vol. 32, No. 7, 2013, pp. 157-166.

Kazi, et al., Motion Ampliers: Sketching Dynamic Illustrations Using the Principles of 2D Animation, In CHI '16, Available Online at: http://dx.doi.org/10.1145/2858036.2858386, 2016, pp. 4599-4609.

Mush3D Time Based Sculpting, Available online at: https://mush3d.com/, 2019, 3 pages.

Maryia, et al., Onion Life Cycle, Available online at: https://www.shutterstock.com/image-vector/onion-life-cycle-growth-stages-seeding-738951745, 2020, 1 page.

Product Development Program, Onshape Inc., 10 pages, 2019.

Guerrero, et al. PATEX: Exploring Pattern Variations, ACM Transactions on Graphics, vol. 35, No. 4, Article 48, Available Online at: http://dx.doi.org/10.1145/2897824.2925950, Jul. 2016, 13 pages.

Zhu, et al., Planar Interpolation with Extreme Deformation, Topology Change and Dynamics, Association for Computing Machinery, Transactions on Graphics, vol. 36, No. 6, Article No. 213, Available Online at: http://dx.doi.org/10.1145/3130800.3130820, Nov. 2017, 15 pages.

Perez, et al., Poisson Image Editing, ACM Transactions on Graphics (TOG), vol. 22, ACM, 2003, pp. 313-318.

Lewis, et al.Practice and Theory of Blendshape Facial Models, Eurographics (State of the Art Reports), vol. 1, No. 8, 2014, 20 pages.

Horvitz Principles of Mixed-Initiative User Interfaces, In CHI '99, May 15-20, 1999, pp. 159-166.

Quill Storytelling in VR, Facebook Quill, Available Online at: https://quill.fb.com/, 2019, 1 page.

Lee, et al., Real-Time User Guidance for Freehand Drawing ACM Transactions on Graphics, vol. 30, No. 4, Article 27, Available Online at: http://dx.doi.org/10.1145/2010324.1964922, Jul. 2011, 10 pages.

Hahn, et al., Rig-Space Physics, ACM Transactions on Graphics, vol. 31, No. 4, Article 72, Available Online at: http://dx.doi.org/10.1145/2185520.2185568, Jul. 2012, 8 pages.

SANTONISculptstat: Statistical Analysis of Digital Sculpting Workflows Available online at: https://arxiv.org/pdf/1601.07765.pdf, Jan. 28, 2016, 9 pages.

(56) References Cited

OTHER PUBLICATIONS

Choi, et al., SketchiMo: Sketch-Based Motion Editing for Articulated Characters, Association for Computing Machinery Transactions on Graphics, Article No. 146, vol. 35, No. 4, Jul. 2016, 12 pages.

Guay, et al., Space-Time Sketching of Character Animation ACM Transactions on Graphics, vol. 34, No. 4, Article 118, Available Online at: http://dx.doi.org/10.1145/2766893, Aug. 2015, 10 pages.

Arora, et al., SymbiosisSketch: Combining 2D & 3D Sketching for Designing Detailed 3D Objects in Situ, Proceedings of the 2018 Chi Conference on Human Factors in Computing Systems, Available Online at: https://doi.org/10.1145/3173574.3173759, Apr. 2018, 15 pages.

Suzuki, et al., Tabby: Explorable Design for 3D Printing Textures, Pacific Graphics, Available Online at: http://dx.doi.org/10.2312/pg.20181273, Proceedings of the 26th Pacific Conference on Computer Graphics and Applications: Short Papers, Oct. 30, 2018, pp. 29-32.

Mealing, The Art and Science of Computer Animation, Intellect Books, Exeter, vol. 1, 1994, 4 pages.

Zwerman, et al., The VES Handbook of Visual Effects: Industry Standard VFX Practices and Procedures, Visual Effects Society Handbook: Work Fow and Techniques, CRC Press, 2012.

Dvoroznák, et al., ToonSynth: Example-Based Synthesis of Hand-Colored Cartoon Animations, ACM Transactions on Graphics, vol. 37, No. 4, Article 167, 11 pages.

Patel, TraceMove: A Data-Assisted Interface for Sketching 2D Character Animation, Proceedings of the 11th Joint Conference on Computer Vision, Imaging and Computer Graphics Theory and Applications: vol. 1: GRAPP (GRAPP 2016), SCITEPRESS—Science and Technology Publications, Feb. 2016, pp. 191-199.

Jazza, Tutorial: Pose to Pose Animation—Keyframes and Motion Breakdown, Available Online at: https://youtu.be/VcBwDHx_oDk, 2014, 1 page.

Kumaravel, et al. TutoriVR: A Video-Based Tutorial System for Design Applications in Virtual Reality, Proceedings of the CHI Conference on Human Factors in Computing Systems, Paper 284, May 4-9, 2019, 12 pages.

ZBRUSH, Pixologic, Available online at: http://pixologic.com/zbrush/, 2019, 3 pages.

\* cited by examiner

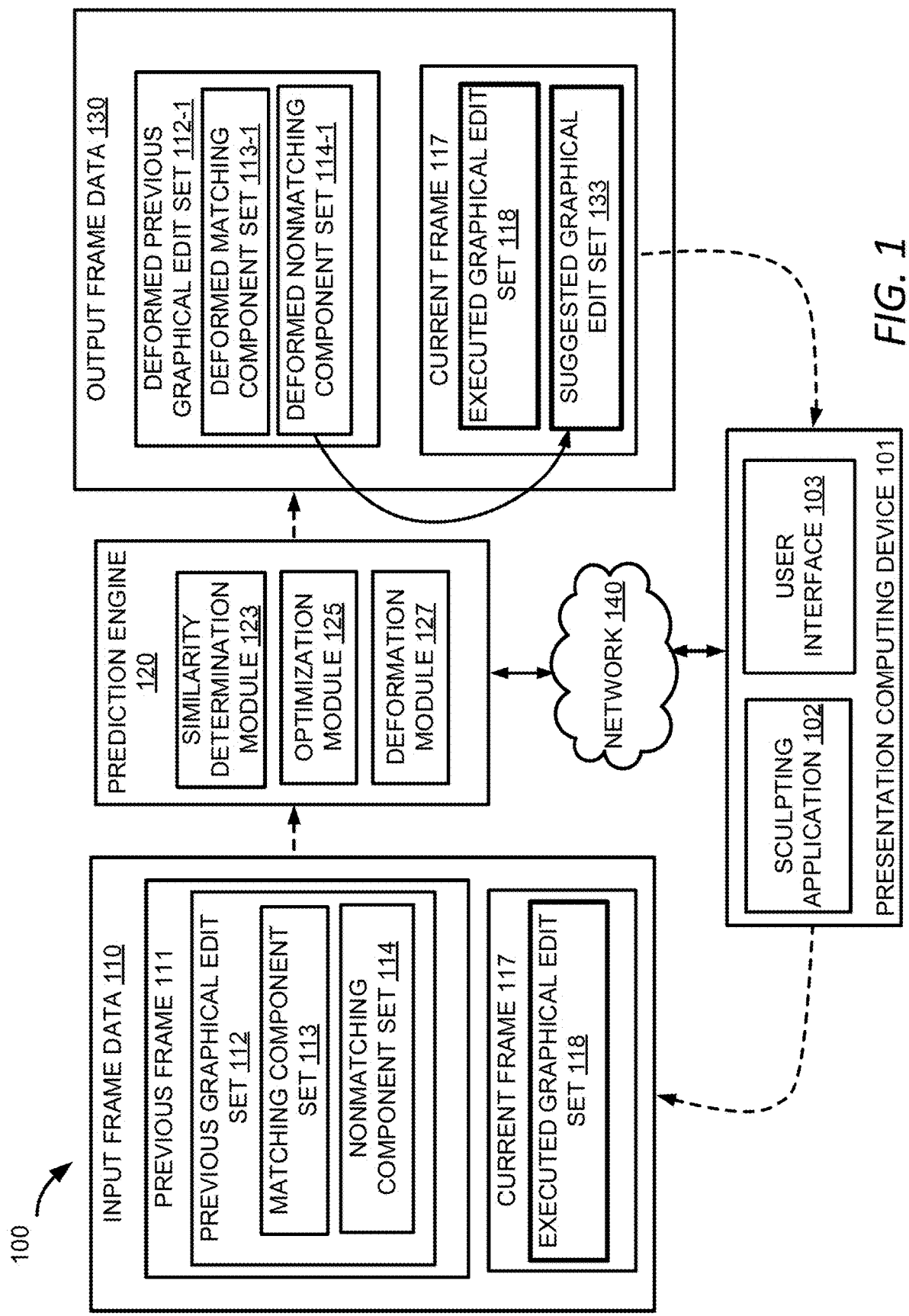

200

210
ACCESSING SAMPLES DEFINING A PREVIOUS GRAPHICAL EDIT SET APPLIED TO A MESH OBJECT IN A PREVIOUS FRAME AND AN EXECUTED GRAPHICAL EDIT SET APPLIED TO THE MESH OBJECT IN A CURRENT FRAME

220
IDENTIFY, FROM A COMPARISON OF SAMPLES, A MATCHING COMPONENT SET FROM THE PREVIOUS GRAPHICAL EDIT SET THAT CORRESPONDS TO THE EXECUTED GRAPHICAL EDIT SET

230
DEFORM THE SAMPLES REPRESENTING THE PREVIOUS GRAPHICAL EDIT SET TOWARD THE SAMPLES REPRESENTING THE EXECUTED GRAPHICAL EDIT SET

240
DETERMINE A SUGGESTED GRAPHICAL EDIT SET CORRESPONDING TO THE NON-MATCHING COMPONENT SET, FROM THE PREVIOUS GRAPHICAL EDIT SET, THAT IS MODIFIED BASED ON THE DEFORMED SAMPLES

250
UPDATE AN INTERFACE TO PROVIDE THE SUGGESTED GRAPHICAL EDIT SET FOR AUGMENTING THE EXECUTED GRAPHICAL EDIT SET IN THE CURRENT FRAME

*FIG. 2*

Brush strokes in a frame represented by samples 400

Brush strokes in a frame represented by samples 400

GENERATING SUGGESTED EDITS FOR THREE-DIMENSIONAL GRAPHICS BASED ON DEFORMATIONS OF PRIOR EDITS

TECHNICAL FIELD

This disclosure generally relates to facilitating the creation or manipulation of graphic objects. More specifically, but not by way of limitation, this disclosure relates to generating, based on deformations of prior editing operations performed with a graphics editing tool, suggested editing operations that augment current editing operations applied to a graphical object.

BACKGROUND

Illustrator computing systems provide editing tools for creating and editing three-dimensional (3D) objects via keyframe-based sculpting to generate animated sequences. In keyframe-based sculpting, an artist executes, using editing tools, a set of manipulation operations (e.g., translation and/or rotation) to a mesh object and/or a graphical edit set (e.g., using sculpting tools such as drag and clay) to sculpt a surface of the mesh object across multiple frames. When creating certain animated sequences (e.g., a growing tree, a flying insect), artists often execute repetitive sequences of similar brush strokes and/or manipulation operations to the 3D mesh object within frames and over multiple frames. Consequently, an artist's experience using keyframe-based sculpting tools to generate such animation sequences may involve burdensome and tedious repetition of sequences of sculpting operations.

These issues can be addressed, to some extent, by editing tools that reduce input with respect to sketching and modeling. However, existing editing tools have limited utility in animated sequences involving deformation of a mesh surface. For instance, existing editing tools are not able to perform well in keyframe-based sculpting because they fail to consider that operations such as brush strokes must proceed from within a particular region (a surface of the mesh), which could result in suggesting operations that cannot be executed within the editing tool and that therefore provide no benefit to the artist. Existing methods used by editing tools also are not able to perform well in keyframe-based sculpting because they solely consider either a spatial or a temporal similarity of operations and fail to consider a combined spatial-temporal similarity over frames; this could result in suggested operations that are irrelevant to an artist who might deviate from a previous order in which brush strokes have been executed.

SUMMARY

Certain embodiments involve generating, based on deformations of prior editing operations performed with a graphics editing tool, suggested editing operations that augment current editing operations applied to a graphical object. For example, a prediction engine accesses first samples defining first positions along first paths of previous editing operations applied to a mesh object in a previous frame and second samples defining second positions along second paths of executed editing operations applied to the mesh object in a current frame. The prediction engine identifies, from a comparison of the first samples and the second samples, a matching component set from the previous editing operations that corresponds to the executed editing operations, wherein the previous editing operations comprises the matching component set and a non-matching component set. The prediction engine deforms, using a deformation model, the first samples toward the second samples. The prediction engine determines suggested editing operations that comprise the non-matching component set as modified based on the deformed first samples. The prediction engine updates an interface to provide the suggested editing operations for augmenting the executed editing operations in the current frame.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

FIG. 1 depicts an example of a computing environment for updating an interface to provide a suggested graphical edit set to augment an executed graphical edit set in a current frame, according to certain embodiments described in the present disclosure.

FIG. 2 depicts an example of a method for updating an interface to provide a suggested graphical edit set to augment an executed graphical edit set in a current frame, according to certain embodiments described in the present disclosure.

DETAILED DESCRIPTION

Figure 3:
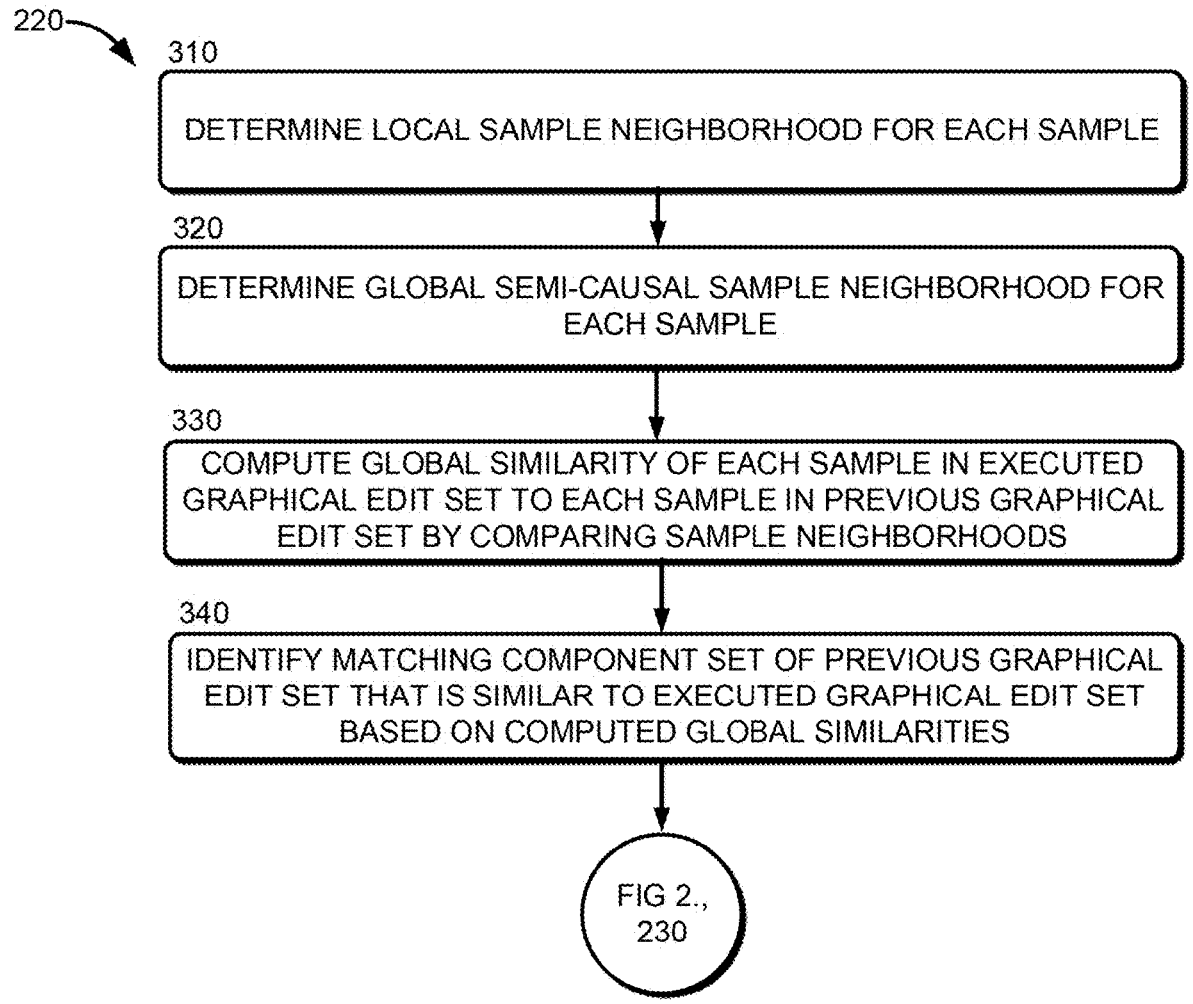
FIG. 3 depicts an example of a method for identifying, from a comparison of samples, a matching component set from a previous graphical edit set that corresponds to an executed graphical edit set, according to certain embodiments described in the present disclosure.

The present disclosure involves generating, based on deformations of prior editing operations performed with a graphics editing tool, suggested editing operations that augment current editing operations applied to a graphical object, such as brush strokes applied to a mesh object in a three-dimensional (3D) animated sculpting frame. As explained above, conventional editing tools provided by illustrator systems allow artists to generate and edit 3D mesh objects to generate animated sequences using keyframe-based sculpting tools. However, this type of manual editing of mesh objects often results in users having to engage in burdensome and repetitive maneuvers when creating animated sequences that require successive editing inputs that are spatially and temporally similar within frames and across frames (e.g., successively repeated patterns of similar brush strokes applied to the mesh object), thereby degrading the functionality of editing tools. Certain embodiments described herein can avoid one or more of these problems. For instance, a graphics editing tool detects a correspondence between a set of previous operations applied to the mesh object in a previous frame and a set of executed operations in a current frame. The graphics editing tool deforms the set of previous operations toward the set of executed operations and suggests, for the current frame, a set of edits generated from the deformed set of previous operations. These embodiments can improve the functionality of graphics editing tools by increasing the efficiency with which a user can execute similar patterns of operations on a 3D object over multiple frames.

The following non-limiting example is provided to introduce certain embodiments. In this example, an editing tool includes a prediction engine that is used to suggest edits based on prior user edits. The prediction engine accesses previous editing operations that the editing tool has been instructed to apply to a mesh object in a previous frame, and also accesses executed editing operations that the editing tool has been instructed to apply to the mesh object in a current frame. These editing operations include, for example, first-order edits specified via user input that proceed from or adhere to a surface of the mesh object and result in second-order mesh surface deformations of the mesh object (e.g., brush stroke editing operations) or transformations of the mesh object (e.g., manipulation editing operations). Brush stroke editing operations are applied to the mesh object using tools such as a clay brush tool, a crease brush tool, a grab brush tool, a smooth brush tool, a flat brush tool, a drag brush tool, and other tools and cause specific types deformations of the mesh object surface (e.g., pulling the mesh surface outward, forming a dimple in the mesh surface, smoothing the mesh surface). Manipulation editing operations include specific types of transformations of the mesh object that result from using tools such as a translation tool, a rotation tool, a resizing tool, or other tool that modifies a shape of the mesh object. In a simplified example, the prediction engine identifies a set of n previous operations, finds a correspondence between the previous editing operations 1 . . . i and a set of executed editing operations 1 . . . i, and uses modified versions of the previous editing operations i+1 . . . n to generate a suggested set of editing operations i+1 . . . n to be applied in the current frame.

For instance, the prediction engine also accesses samples representing positions along first paths of the previous editing operations and samples representing positions along second paths of the second set of executed editing operations, for example, an animated sequence showing a growth of a tree that includes multiple frames. In some examples, the samples represent positions at specified intervals along the first paths and the second paths. In this example, in a previous frame of the sequence, a first brush stroke operation of a drag brush tool pulls a surface of the mesh object at a first branch in a first direction, and a second brush stroke operation of the drag brush tool pulls the mesh object surface at a second branch in a second direction. The prediction engine also determines that a third brush stroke with the drag brush tool has been applied to the mesh object in the current frame to drag the mesh object at the second branch further in the second direction in a similar manner as when the second brush stroke operation previously dragged the second branch in the second direction. In this example, the prediction engine identifies a first sample representing a position at which a path of the first brush stroke originated on the mesh object surface in the current frame, a second sample representing a position at an end of the path of the first brush stroke in the current frame, a third sample representing a position at which a path of a second brush stroke originated on the mesh object surface in a previous frame, and a fourth sample representing a position at an end of the path of the second brush stroke in the previous frame. In addition to positional information, samples could also include temporal parameters indicating an order of the sample compared to other samples.

The prediction engine also identifies, by comparing the samples, a matching component set from the previous editing operations that corresponds to the executed editing operations. For instance, the previous editing operations include a matching component set that includes editing operations of the previous frame that are similar to the executed editing operations of the current frame and a non-matching component set that includes editing operations in the previous frame that are not similar to the executed set of editing operations of the current frame. Continuing with the example discussed previously, the prediction engine determines that the third brush stroke in the current frame (further pulling the second branch in the second direction) corresponds to the second brush stroke in the previous frame (that previously pulled the second branch in the second direction) and, accordingly, identifies the second brush stroke in the previous frame as the matching component set and the first brush stroke (that previously pulled the first branch in the first direction) in the previous frame as the non-matching component set.

To identify the matching component, the prediction engine determines a local sample neighborhood for each sample in the previous frame and for each sample in the current frame. The local sample neighborhood is a spatial comparison of a sample in a frame with other samples in the frame located within a proximity to the sample. For each sample, the prediction engine also determines a global sample neighborhood that is an accumulation of local sample neighborhoods of the sample and of preceding samples that are part of a common parent editing operation in the set of editing operations of the same frame. The prediction engine compares the global sample neighborhoods of each of the samples of the previous frame against global sample neighborhoods of each of the samples of the current frame and identifies a matching set of samples of the previous frame that correspond to the samples of the current frame. The prediction identifies, as a non-matching set of samples, samples in the previous frame that are insufficiently similar to samples in the current frame.

For instance, in the example described above, the prediction engine determines a local sample neighborhood for each of the four samples representing the two brush strokes in the previous frame and the two samples representing the brush stroke executed in the current frame. In this example, the global sample neighborhood for the second sample at the end of the first brush stroke of the previous frame includes the local sample neighborhood of the second sample located at the end of the first brush stroke and the local sample neighborhood of the first sample that is located where the first brush stroke proceeds from the mesh object surface. The global sample neighborhood of the second sample in the previous frame does not include the local sample neighborhoods of the third and fourth samples because (1) the third and fourth samples represent a separate brush stroke proceeding from the mesh object surface that is not represented in part by the second sample and (2) the third and fourth samples represent positions in brush stroke paths that occur after the second sample. In this example, the prediction engine compares the global sample neighborhoods of each of the four samples of the previous frame with the two samples of the current frame. In this example, the prediction engine determines that the third and fourth samples that represent a second brush stroke in the previous frame are a matching set of samples that correspond to the first and second samples representing the executed brush stroke in the current frame. Consequently, in this example, the prediction engine determines that the first and second samples that represent a first brush stroke in the previous frame are a non-matching set of samples.

The prediction engine deforms, using a deformation model, the samples representing the previous set of editing operations in the previous frame toward the samples representing the executed set of editing operations in the current frame. The samples of the current frame act as an implicit deformation handle to deform, using the deformation model, the samples of the previous frame toward the samples of the current frame. For instance, the deformation model is optimized using the matching set of samples of the previous frame and the samples of the current frame. The deformation model includes deformation constraints to guide the deformation, including a sculpting constraint to push starting samples (e.g., samples representing a beginning of an editing operation) to adhere to the mesh surface. The deformation of each sample of the previous frame (including matching and non-matching samples) is influenced by deformations of neighbor samples corresponding to the local sample neighborhood of the sample.

For instance, continuing with the previous example discussed above, the prediction engine deforms the four samples representing the two brush strokes in the previous frame toward the two samples representing the brush stroke executed in the current frame. In this example, the two samples representing the brush stroke executed in the current frame act as an implicit deformation handle to guide the deformation of the four samples representing the two brush strokes in the previous frame. In this example, a clustering engine uses the first and second samples of the current frame and the matching third and fourth samples representing the second of two brush strokes in the previous frame to optimize a deformation model. In this example, the clustering engine deforms the four samples of the previous frame toward the two samples of the current frame using the optimized deformation model.

The prediction engine determines suggested editing operations based on the deformed samples that represent the non-matching component. For instance, the prediction engine determines a position and order of the non-matching set of deformed samples representing the non-matching component set of the set of editing operations of the previous frame. The prediction determines a suggested set of operations using order and position information of the non-matching set of deformed samples. The prediction engine provides the suggested set of operations to augment the executed set of operations in the current frame. In certain embodiments, the prediction engine executes the suggested set of operations responsive to receiving an input.

In the example discussed above, the prediction engine determines a position and order of the non-matching set of deformed first and second samples that represent the first brush stroke in the previous frame. The prediction engine uses the order and position of the deformed first and second samples of the previous frame to suggest a brush stroke operation in the current frame to augment the executed brush stroke operation in the current frame. The brush stroke operation recommended by the prediction engine augments the executed brush stroke operation in the current frame so that the combined set of brush stroke operations in the current frame is similar to the brush stroke operations of the previous frame. In this example, even though the brush strokes are executed in reverse order in the current frame (i.e., the second brush stroke of the previous frame corresponds to the executed brush stroke of the current frame), the deformation model provides a suggested brush stroke operation that will complement the executed brush stroke. By doing so, when the suggested brush stroke operation is executed, the resulting combination of brush strokes in the current frame is similar to the combination of brush strokes in the previous frame. In this example, the prediction engine executes the suggested brush stroke operation responsive to receiving an input.

Certain embodiments provide improvements to computing systems by lessening a burden of navigation of user interfaces. Examples of burdensome user interface navigation include excessive inputs required to repeat patterns of editing operations over multiple frames. Improvements that reduce this burdensome user interface navigation can be affected by providing a suggested set of editing operations to augment an executed set of editing operations of a current frame. For instance, the global sample neighborhood analysis comparing samples representing a set of editing operations in a current frame and samples representing a set of editing operations in a previous frame allows a computing system to identify a matching set of samples of the previous frame that is similar to samples in the current frame. Identifying the similar set of samples in the previous frame allows the computing system to suggest, based on the assessed similarity, a set of editing operations represented by the non-matching samples of the previous frame that are deformed, using a deformation model, toward the samples of the current frame. Suggesting editing operations in this manner improves the functionality of the interface by, for example, reducing the amount of navigation required via the user interface to perform repeated patterns of editing operations to a mesh object over multiple frames. These techniques, therefore, decrease the amount of time or effort a user spends on performing repeated similar set of editing operations.

Also, comparing editing operations between frames using a global neighborhood similarity analysis that considers both spatial and temporal similarity between samples representing editing operations improves the functionality of the interface by, for example, allowing the user interface to provide useful suggested editing operations to augment an executed set of editing operations even when a user begins to execute editing operations in a current frame in a different order from a similar set of operations executed in a previous frame. These techniques, therefore, allow a user flexibility to change an order of execution of patterns of editing operations while still providing useful suggested set of editing operations.

Further, certain embodiments provide improvements to computing systems by improving methods of suggesting editing operations that would otherwise result in invalid suggestions in the context of generating animated sequences using keyframe-based sculpting tools. An example of an invalid suggestion is an editing operation having a path that does not proceed from or adhere to a mesh object. Such a suggested operation would not generate a useful output to an artist as the suggested operation is not executable. Improvements that reduce a probability of invalid suggested operations include optimizing the deformation model using a sculpting constraint.

Additionally or alternatively, the embodiments described herein decrease the amount of time or effort a user spends on performing repeated patterns of editing operations on a mesh object over one or more successive frames. The impracticality of manual execution of repetitive editing operations increases as the number of necessary operations to generate an animation increases. Instead of a user manually performing multiple similar sets of editing operations, the techniques described herein automatically and logically provide a suggested set of editing operations for the user.

Example of an Operating Environment for Constructing an Object Hierarchy for a Vector Design Using a Clustering Algorithm Referring now to the drawings, FIG. 1 depicts an example of a computing environment 100 for updating an interface to provide a suggested graphical edit set to augment an executed graphical edit set in a current frame. In this example, the computing environment 100 includes a prediction engine 120 and a presentation computing device 101, where the prediction engine 120 accesses input frame data 110 that includes a previous frame 111 including a previous graphical edit set 112 and a current frame 117 that includes an executed graphical edit set 118 and generates output frame data 130 including a suggested graphical edit set 133 to augment the executed graphical edit set 118 in the current frame 117. The prediction engine 120 executes one or more software modules that support updating the interface to provide the suggested graphical edit set 133 for a current frame 117 to augment the executed graphical edit set in the current frame 117.

In the example depicted in FIG. 1, the prediction engine 120 accesses input frame data 110 including a previous frame 111 and a current frame 117. The previous frame 111 includes a previous graphical edit set 112. The current frame 117 includes an executed graphical edit set 118. The input frame data 110 includes a current state (e.g., shape information, color information) of the mesh object after application of the executed graphical edit set 118 to the mesh object in the current frame 117. In some embodiments, the prediction engine 120 receives the input frame data 110, which is created by one or more users using a sculpting application 102 of a presentation computing device 101. The previous graphical edit set 112 in the previous frame 111 and the executed graphical edit set 118 in the current frame 117 include multiple brush strokes, respectively, executed on the mesh object. The previous graphical edit set 112 and the executed graphical edit set 118 are executed via a common tool of the sculpting application 102, for example, a drag brush tool, a clay brush tool, or other brush tool that causes a deformation of a surface of the mesh object. In some embodiments, instead of a previous graphical edit set 112 and an executed graphical edit set 118, the previous frame 111 includes a previous manipulation operation set and an executed manipulation operation set performed via a common manipulation tool of the sculpting application 102 (e.g., a translation tool, a rotation tool, a resizing tool) to transform the mesh object.

In certain examples, the previous manipulation operation set (e.g., a previous graphical edit set 112) includes a set of manipulation operations executed in the previous frame 111 via the manipulation tool in a particular order (e.g., a series of manipulation operations). In certain examples, the executed manipulation operation set (e.g., an executed graphical edit set 118) includes a set of manipulation operations executed in the current frame 117 via the manipulation tool in a particular order (e.g., a series of manipulation operations).

As shown in FIG. 1, the prediction engine 120 determines, from the input frame data 110, output frame data 130 including a suggested graphical edit set 133 for the current frame 117. The suggested graphical edit set 133 is a graphical edit set to augment the executed graphical edit set 118. The prediction engine 120 determines the suggested graphical edit set 133 by (1) comparing the previous graphical edit set 112 and the executed graphical edit set 118 to identify, in the previous graphical edit set 112, a matching component set 113 that corresponds to the executed graphical edit set 118 and a non-matching component set 114 that does not correspond to the executed graphical edit set 118; (2) deforming the previous graphical edit set 112 toward the executed graphical edit set 118 using a deformation model to generate a deformed previous graphical edit set 112-1 that includes a deformed matching component set 113-1 and a deformed non-matching component set 114-1; and (3) determining the suggested graphical edit set 133 to be the deformed non-matching component set 114-1 of the deformed previous graphical edit set 112-1. Comparing the previous graphical edit set 112 in the previous frame 111 to the executed graphical edit set 118 in the current frame 117 to identify, from the previous graphical edit set 112, a matching component set 113 and a non-matching component set 114 is described below in FIGS. 2-3 and in examples illustrated in FIGS. 4-6. Deforming the previous graphical edit set 112 using the deformation model to provide the deformed non-matching component set 114-1 of the deformed previous graphical edit set 112-1 as the suggested graphical edit set 133 is further described below in FIG. 2.

In some embodiments, the prediction engine 120 generates the output frame data 130 including the suggested graphical edit set 133 using a similarity determination module 123, an optimizing module 125, and a deformation module 127. The similarity determination module compares the previous graphical edit set 112 and the executed graphical edit set 118 to identify, in the previous graphical edit set 112, a matching component set 113 that corresponds to the executed graphical edit set 118 and a non-matching component set 114 that does not correspond to the executed graphical edit set 118. For instance, the similarity determination module 123 generates first samples representing the previous graphical edit set 112, generates second samples representing the executed graphical edit set 118, and compares the first samples and the second samples to identify a first set of first samples that are similar to the second samples that represent the matching component set 113 and a second set of first samples that are dissimilar to the second samples that represent the non-matching component set 114. Comparing the first samples and the second samples involves identifying first-second sample pairs across the previous frame 111 and current frame 117 by comparing global sample neighborhoods of each of the first samples to each of the second samples. The similarity determination module 123 determines the global sample neighborhoods by (1) determining a local sample neighborhood for each of the first and second samples that describes other samples that are spatially proximate to the sample in the same frame and (2) determining a global sample neighborhood for each of the first samples and the second samples that describes other samples that are both spatially proximate to and temporally preceding the sample. A global sample neighborhood of a subject sample is an accumulation of the sample neighborhood of the subject sample and sample neighborhoods of samples temporally preceding the subject sample in a brush stroke that includes the subject sample in the same frame as the subject sample.

The optimizing module 125 optimizes a deformation model using the matching component set 113 of the previous frame 111 and the executed graphical edit set 118 of the current frame 117. The deformation model is used by the deformation module 127 to deform the first samples representing the previous graphical edit set 112 toward the second samples representing the executed graphical edit set 118. For instance, the optimizing module 125 optimizes the deformation model using the second samples representing the executed graphical edit set 118 that correspond to the matching set of first samples representing the matching component set 113 as an implicit deformation handle to guide the deformation of the first samples representing the previous graphical edit set 112. The optimizing module 125 determines multiple optimizing constraints, including a sculpting constraint that ensures that brush strokes of the deformed previous graphical edit set 112-1 output using the deformation model adhere to or proceed from the mesh object.

The deformation module 127 deforms, using the optimized deformation model, the previous graphical edit set 112 of the previous frame 111 toward the executed graphical edit set 118 of the current frame to generate a deformed previous graphical edit set 112-1. For instance, the deformation module 127 deforms the first samples representing the previous graphical edit set 112 toward the second samples representing the executed graphical edit set 118 using the optimized deformation module. The deformation of each of the first samples is influenced by a deformation of proximate samples in its local sample neighborhood as well as by the constraints determined via the optimizing module 125. The deformed previous graphical edit set 112-1 includes a set of deformed first samples representing the deformed matching component set 113-1 and a set of deformed first samples representing the deformed non-matching component set 114-1. The deformation module 127 determines the suggested graphical edit set 133 from the set of deformed first samples representing the deformed non-matching component set 114-1. In certain examples, the deformation module 127 provides the suggested graphical edit set 133 to augment the executed graphical edit set 118 in the current frame 117 to the sculpting application 102.

As shown in FIG. 1, the prediction engine 120 communicates with the presentation computing device 101 via the network 140. In other embodiments, the prediction engine 120 operates on the presentation computing device 101 and communicates with the sculpting application 102 on the presentation computing device 101. In some embodiments, the prediction engine 120 receives the input frame data 110 from the presentation computing device 101 and provides the output frame data 130 including the suggested graphical edit set 133 to the presentation computing device 101.

The presentation computing device 101 includes a sculpting application 102 and a user interface 103. The sculpting application 102 provides tools to edit a mesh object over multiple frames to generate an animated sequence. The tools can used to apply brush strokes, manipulation operations (e.g., translation, resizing, rotation), or other editing operations to a mesh object. The sculpting application 102 communicates with the prediction engine 120 and is downloadable onto a presentation computing device 101 or accessible via the network 140 using a web browser application of the presentation computing device 101.

The user interface 103 displays a mesh object in a current frame 117, which is editable via input of one or more users via the user interface 103 of the presentation computing device 101. The sculpting application 102 detects, via the user interface 103, inputs including selection of an editing tool (e.g., a brush stroke tool, a manipulation tool) and application of one or more editing operations to the mesh object using the editing tool. For instance, the sculpting application 102 detects, via the user interface 103, user inputs causing the executed graphical edit set 118 to be applied to the mesh object in the current frame 117. In embodiments described herein, the sculpting application 102 displays, via the user interface 103, the suggested graphical edit set 133 determined by the prediction engine 120 to augment the executed graphical edit set 118 in the current frame. In some examples, the sculpting application 102 displays, via the user interface 103, a visual representation of the suggested graphical edit set 133 in the current frame 117. For instance, the sculpting application 102 displays, via the user interface 103, one or more paths of the suggested graphical edit set 133 in the current frame 117. In an example, the sculpting application 102 receives, via the user interface 103, an input confirming the suggested graphical edit set 133. In another example, the sculpting application 102 receives, via the user interface 103, an input rejecting the suggested graphical edit set 133. In some instances, the sculpting application 102 applies the suggested graphical edit set 133 to the mesh object to augment the executed graphical edit set 118 in the current frame responsive to receiving an input confirming the suggested graphical edit set 133 and renders an updated mesh object in accordance with application of the suggested graphical edit set 133 in the current frame 117. In other instances, the sculpting application 102 receives, via the user interface 103, an input rejecting the suggested graphical edit set 133.

In the examples described herein, the presentation computing device 101 is separate from the prediction engine 120. However, in some embodiments, the presentation computing device 101 is a component or subsystem of the prediction engine 120, the prediction engine 120 is a component or subsystem of the presentation computing device 101, or the functions of both the presentation computing device 101 and the prediction engine 120 are performed by a combined device or system. In some embodiments, the prediction engine 120 performs one or more the functions of sculpting application 102 and/or presentation computing device 101 described in the examples above. In some embodiments, the presentation computing device 101 performs one or more the functions of the prediction engine 120 described in the examples above.

One or more of the prediction engine 120 and the presentation computing device 101 include a device having a communication module capable of transmitting and receiving data over a data network 140. For instance, one or more of the prediction engine 120 and the presentation computing device 101 include a server, a desktop computer, a laptop computer, a tablet computer, a television with one or more processors embedded therein and/or coupled thereto, a smart phone, a handheld computer, or any other wired or wireless, processor-driven device. Examples of the data network 140 include, but are not limited to, internet, local area network (LAN), wireless area network, wired area network, wide area network (WAN), and the like. The data network 140 includes a wired or wireless telecommunication means by which network systems communicate and exchange data. For example, each data network is implemented as, or is a part of, a storage area network (SAN), a personal area network (PAN), a metropolitan area network (MAN), a LAN, a WAN, a wireless LAN (WLAN), a virtual private network (VPN), an intranet, an Internet, a mobile telephone network, a card network, a Bluetooth network, a Bluetooth low-energy (BLE) network, a near-field communication (NFC) network, any form of standardized radio frequency, or any combination thereof, or any other appropriate architecture or system that facilitates communication of signals, data, and/or messages (generally referred to as data). It should be understood that the terms "data" and "information" are used interchangeably herein to refer to text, images, audio, video, or any other form of information that exists in a computer-based environment.

Examples of Operations for Providing a Suggested Graphical Edit Set to Augment an Executed Graphical Edit Set in a Current Frame FIG. 2 depicts an example of a method 200 for updating an interface to provide a suggested graphical edit set 133 to augment an executed graphical edit set 118 in a current frame 117, according to certain embodiments. For illustrative purposes, the method 200 is described with reference to the components illustrated in FIG. 1, although other implementations are possible. For example, the program code for the prediction engine 120, which is stored in a non-transitory computer-readable medium, is executed by one or more processing devices to cause the prediction engine 120 to perform one or more operations described herein.

At block 210, the method 200 involves the prediction engine 120 accessing samples defining a previous graphical edit set 112 applied to a mesh object in a previous frame 111 and an executed graphical edit set 118 applied to the mesh object in a current frame 117. In an example, the prediction engine 120 is associated with a keyframe sculpting animation service provided by an illustrator system. For instance, the keyframe sculpting animation service provides a sculpting application 102 for download on a presentation computing device 101 that includes tools for creation and editing of a mesh object over multiple frames to generate an animated sequence. The sculpting application 102 generates or imports a mesh object, generates frames, and applies sculpting and/or manipulation operations to the mesh object to deform a surface of the mesh object and/or transform the mesh object to generate an animated sequence over multiple frames responsive to receiving inputs via the user interface 103 of the presentation computing device 101, which are input by an artist. For instance, brush stroke operations applied to the surface of the mesh object using sculpting tools (e.g., a clay brush tool, a drag brush tool, a grab brush tool, a crease brush tool) create details and/or deformations of the surface of the mesh object and manipulation operations applied to the mesh object using manipulation tools (e.g., a rotation tool, a translation tool, a resizing tool) over multiple frames to facilitate a motion of the mesh object in the animation. In some examples, the sculpting application 102 logs each of the brush stroke operations and manipulation operations applied to the mesh object including an identifier indicating a frame of the animated sequence in which the respective operation is applied, an identifier indicating a tool (e.g., a sculpting tool, a manipulation tool) associated with the operation, an indication of a path of an input associated with the operation within the frame, and an indication of an order of the operation with respect to other operations applied in the frame. In an example, the sculpting application 102 can generate a new frame responsive to receiving an input via the user interface 103. In this example, responsive to generating the new frame, the current frame 117 becomes a previous frame 111 and the generated new frame becomes the current frame 117. The animation sequence includes a current frame 117 in which a latest executed graphical edit set 118 is executed on the mesh object as well as one or more previous frames 111 including a previous graphical edit set 112. The prediction engine 120 receives input frame data 110 including the previous frame 111, the previous graphical edit set 112, the current frame 117, and the executed graphical edit set 118 from the sculpting application 102, or accesses the input frame data 110 from a database, for example, a database of the keyframe sculpting animation service.

In certain embodiments, the prediction engine 120 generates samples to represent the previous graphical edit set 112 and the executed graphical edit set 118. For instance, the prediction engine represents each brush stroke operation in the previous graphical edit set 112 and the executed graphical edit set 118 as a set of samples. Each sample s includes a set of attributes u(s) as follows:

$$u(s)=(p(s),a(s),t(s),m(s)) \qquad \text{(Equation 1)}$$

where p(s) is a position, a(s) is a set of appearance parameters, t(s) is a set of temporal parameters, and m(s) is a local deformation across frames. The position indicates a position along a path of the brush stroke operation. Appearance parameters include a brush tool type (e.g., drag brush tool, crease brush tool, clay brush tool), a radius, a pressure, and a normal for the brush stroke operation. Temporal parameters include a global frame index indicating a frame in which the brush stroke represented by the sample is located within the animated sequence, a parent brush stroke index that indicates a brush stroke operation to which the sample pertains, and a sample index that indicates a relative position within its parent brush stroke compared to other samples that represent the parent brush stroke. The local deformation across frames indicates a local deformation of the sample from a previous frame to the current frame via a matrix A and a translation vector δ.

In certain examples, the prediction engine 120 accesses or otherwise generates transformation matrices to represent manipulation operations in the previous frame 111 and in the current frame 117. For instance, transformation matrices are of a predetermined size (e.g. a 4×4 transformation matrix) and describe transformation operations (e.g. translation, rotation, scaling) executed with respect to the mesh object. A transformation matrix represents parameters (e.g. a distance, a direction) of a specific transformation operation (e.g. a translation) executed with respect to the mesh object.

Figure 4:
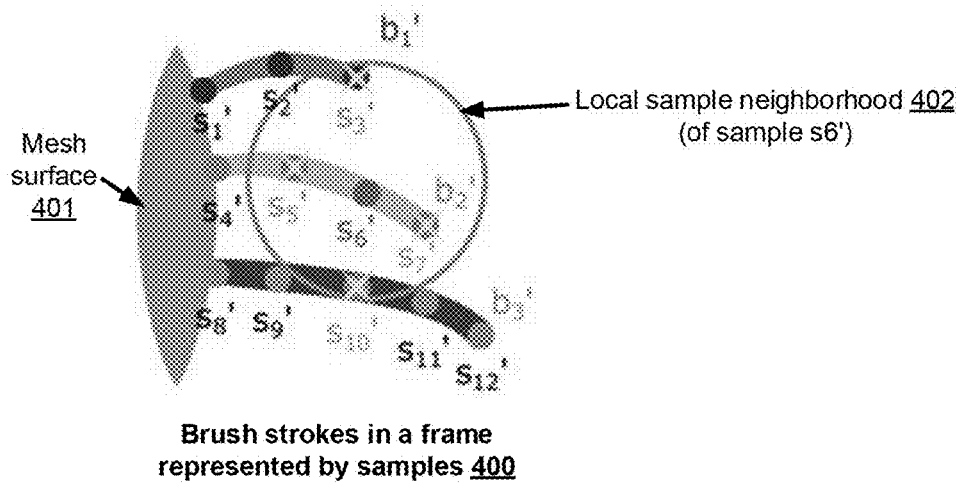
FIG. 4 depicts an illustration of a local sample neighborhood of a sample of a graphical edit set, according to certain embodiments described in the present disclosure.
Figure 5:
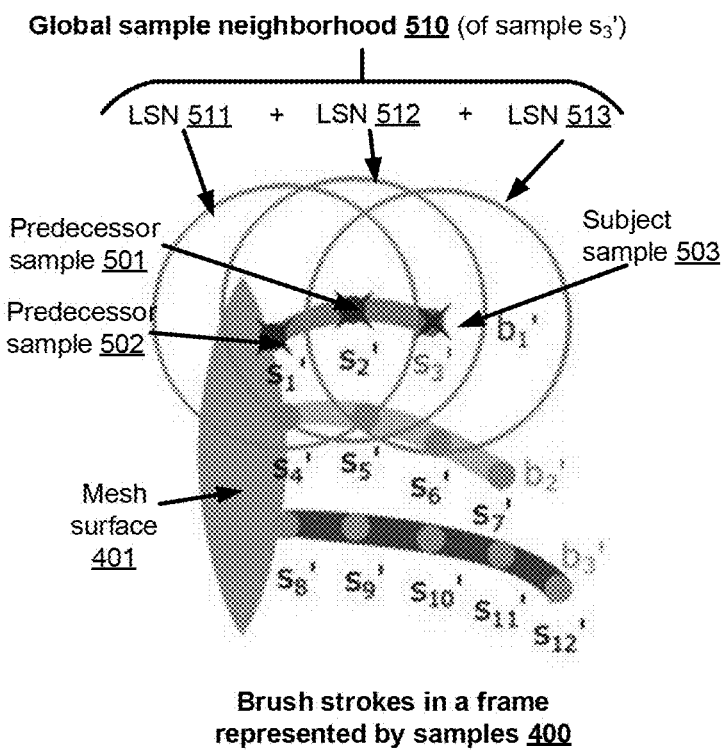
FIG. 5 depicts an illustration of a global sample neighborhood of a sample of a graphical edit set determined by combining local sample neighborhoods of predecessor samples of the graphical edit set determined as illustrated in FIG. 4, according to certain embodiments described in the present disclosure.
Figure 6:
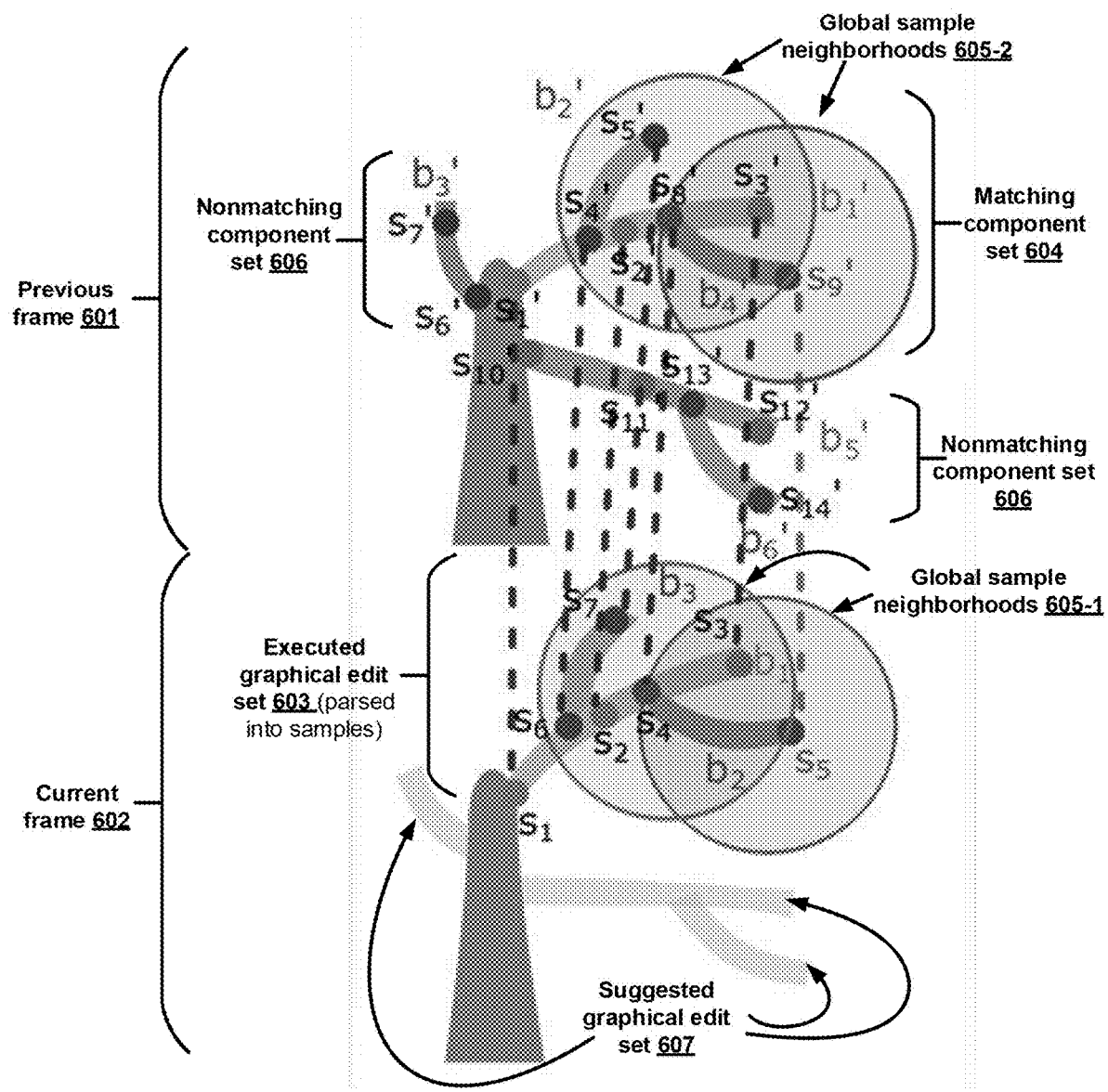
FIG. 6 depicts an illustration of determining a matching component graphical edit set that matches an executed graphical edit set as in FIG. 3, using global sample neighborhoods as illustrated in FIG. 5 as a basis of comparison, according to certain embodiments described in the present disclosure.

At block 220, the method 200 involves the prediction engine 120 identifying, from a comparison of samples, a matching component set 113 from the previous graphical edit set 112 that corresponds to the executed graphical edit set 118. Detailed examples of comparing samples representing the previous graphical edit set 112 in the previous frame 111 to samples representing the executed graphical edit set 118 in the current frame 117 to identify, from the previous graphical edit set 112, a matching component set 113 and a non-matching component set 114 are described below in FIG. 3. Also, FIGS. 4-6 illustrate examples of methods described in FIG. 3. For instance, the detailed example of FIG. 4 describes determining a local sample neighborhood of samples, the detailed example of FIG. 5 describes determining a global sample neighborhood of samples, and the detailed example of FIG. 6 describes comparing global sample neighborhoods representing the previous graphical edit set 112 and the executed graphical edit set 118 to identify a matching component set 113 and a non-matching component set 114 of the previous graphical edit set 112.

At block 230, the method 200 involves the prediction engine 120 deforming the samples representing the previous graphical edit set 112 toward the samples representing the executed graphical edit set 118. For instance, the prediction engine 120 deforms the samples representing the previous graphical edit set 112 toward the samples representing the executed graphical edit set 118, using a deformation model. As previously mentioned in equation (1), each of the samples, including the samples representing the previous graphical edit set 112 in the previous frame 111, includes a parameter m(s) indicating a local deformation across frames.

For example, the deformation parameter $m(s^{K-1})$ of a sample s in the previous frame 111 ($F_{K-1}$) indicates the local deformation at s from the previous frame $F_K$ to the current frame 117 ($F_K$) using a matrix A and a translation vector $\delta$. For instance, the matrix A is a 3×3 matrix and the translation vector $\delta$ is a 3×1 translation vector. The deformation of any sample $s_i$ is influenced by one or more neighbor samples $s_j$. For example, under an influence of a proximate neighbor sample in the previous frame 111, $s_i^{K-1}$ a nearby sample $s_j^{K-1}$ is deformed to a new position in the previous frame, $q_{ji}^{K-1}$, as follows:

$$q_{ji}^{K-1} = A_i(p_j^{K-1} - p_i^{K-1}) + p_i^{K-1} + \delta_i^{K-1} \quad \text{(Equation 2)}$$

where $p_i^{K-1}$ and $p_j^{K-1}$ are the positions of the proximate neighbor sample $s_i^{K-1}$ and nearby sample $s_j^{K-1}$, respectively, in the previous frame 111 and $A_i$ represents the matrix and $\delta_i^{K-1}$ represents the translation vector of the neighbor sample $s_i^{K-1}$ in the previous frame 111. Accordingly, since the deformation of the sample $s_j^{K-1}$ can be influenced by multiple proximate neighbor samples, an accumulated local deformation, $q_i^{K-1}$ for sample $s_j^{K-1}$ in the previous frame can be described as follows:

$$q_i^{K-1} = \sum_{s_i \in n(s_j^{K-1})} \omega_i(s_j^{K-1}) q_{ji}^{K-1} \quad \text{(Equation 3)}$$

by computing a sum of weighted deformations caused by an influence of all neighbor samples in a local sample neighborhood $n(s_j^{K-1})$ of the sample $s_j^{K-1}$. The weighting $\omega_i$ is determined as follows:

$$\omega_i(s_j^{K-1}) = \frac{1 - \|p_j^{K-1} - p_i^{K-1}\|/\Theta}{\sum_{m=1}^{l} 1 - \|p_j^{K-1} - p_m^{K-1}\|/\Theta} \quad \text{(Equation 4)}$$

where $\Theta$ represents a distance to the l-nearest sample. For instance, l determines a size of the local sample neighborhood. Further, the prediction engine 120 further transforms the sample $s_j^{K-1}$ of the previous frame 111 to a deformed position $\varrho_j^{K-1}$ as follows:

$$\varrho_j^{K-1} = \mathcal{R}(q_j^{K-1} - X) + X + \mathcal{T} \quad \text{(Equation 5)}$$

where $\mathcal{R}$ is a rotation matrix relative to a center of mass X of all of the samples of the previous frame 111 and $\mathcal{T}$ is a translation vector.

The deformation of the samples of the previous frame 111 to deformed positions $\varrho_j^{K-1}$ is further guided by constraints that the prediction engine 120 determines for the deformation model. In certain examples, the prediction engine 120 determines the following constraints:

$$\varepsilon = \alpha \varepsilon_{rigid} + \beta \varepsilon_{reg} + \gamma \varepsilon_{fitness} + \eta \varepsilon_{conf} + \xi \varepsilon_{sculpt} \quad \text{(Equation 6)}$$

where $\varepsilon_{rigid}$ is a rigidity constraint, $\varepsilon_{reg}$ is a regularizing constraint, $\varepsilon_{fitness}$ is a fitness constraint, $\varepsilon_{conf}$ is a maximizing constraint, and $\varepsilon_{sculpt}$ is a sculpting constraint, and $\alpha$, $\beta$, $\gamma$, $\eta$, $\xi$ and are weights associated with each of the constraints, respectively.

The rigidity constraint $\varepsilon_{rigid}$ penalizes deviation of each sample transformation from a pure rotation, making deformations as rigid as possible to avoid artifacts. The prediction engine 120 determines the rigidity constraint as follows:

$$\varepsilon_{rigid} = \sum_{s_i^{K-1} \varepsilon K-1} Rot(A(s_i^{K-1})) \quad \text{(Equation 7)}$$

$$Rot(A) = (a_1^T a_2)^2 + (a_1^T a_3)^2 + (a_2^T a_3)^2 + \quad (8)$$
$$(1 - a_1^T a_1)^2 + (1 - a_2^T a_2)^2 + (1 - a_3^T a_3)^2$$

where $a_1$, $a_2$, and $a_3$ are column vectors of 3×3 matrix A.

The regularizing constraint $\varepsilon_{reg}$ ensures that affine transformations of adjacent samples of the previous frame 111 agree with one another and the prediction engine 120 determines the regularizing constraint as follows:

$$\varepsilon_{reg} = \sum_{s_i^{K-1} s_j^{K-1} \in n(s_i^{K-1})} |q_{ji}^{K-1} - q_{ji}^{K-1}|^2 \quad \text{(Equation 9)}$$

The fitness constraint $\varepsilon_{fitness}$ pulls the deformation of the samples from the previous frame 111 toward desired positions in the current frame 117 and the prediction engine 120 determines the fitness constraint as follows:

$$\varepsilon_{fitness} = \sum_{s_i^{K-1}} \varphi_i^2 |\varrho_i^{K-1} - p_i^{K}|^2 \quad \text{(Equation 10)}$$

where a sample $s_i^K$ having position $p_i^K$ on a deformed brush stroke in the current frame 117 is matched to sample $s_i^{K-1}$ that has a deformed position $\varrho_i^{K-1}$ in the previous frame 111 determined according to equation (5), where $\varphi_i$ is a correspondence confidence weight.

The maximizing constraint $\varepsilon_{conf}$ maximizes the correspondence weight of equation (10) used to determine the fitness constraint and the prediction engine 120 determines the maximizing constraint as follows:

$$\varepsilon_{conf} = \sum_{s_i^{K-1}} (1 - \varphi_i^2)^2 \quad \text{(Equation 11)}$$

where values of $\varphi_i$ close to one indicate a reliable correspondence of a sample match, while values of $\varphi_i$ close to zero indicate an improper matching.

Further, the prediction engine 120 determines the sculpting constraint $\varepsilon_{sculpt}$ to push a set of starting samples, $\{\hat{s}^{K-1}\}$ in the previous frame 111 to adhere to the mesh object surface in the current frame 117. The prediction engine 120 determines the sculpting constraint as follows:

$$\varepsilon_{sculpt} = \sum_{s_i^{K-1} \in \tilde{s}^{K-1}} |o_i^{K-1} - \check{p}_i^K|^2 \quad \text{(Equation 12)}$$

where $\check{p}_i^K$ is the corresponding freeform on-surface sample position for each of the starting samples $s_i^{K-1} \in \tilde{s}^{K-1}$. To compute the on-surface sample position for the set of starting samples, the prediction engine 120 ignores the non-surface samples of freeform strokes and considers only the on-surface samples to perform surface registration from the previous frame 111 to the current frame 117. The prediction engine 120 performs the surface registration in a geodesic surface parameterization space and reconstructs the surface results back to 3D space for the set of starting samples.

In some examples, to optimize the prediction framework of equations (2)-(12) including the deformation model and the optimizing constraints, the prediction engine 120 performs an optimization using equation (6). The unknowns of equation (6) include affine transformations of samples in a source frame (the previous frame 111 or the current frame 117), global rigid transformation, sample correspondences of equation (10), and correspondence confidence weights $\varphi_i$ for each sample. For instance, in a two-pass optimization, the prediction engine 120 first (1) deforms the samples in the current frame 117 toward the samples in the previous frame 111 and updates correspondence confidence weights and then (2) deforms the samples in the previous frame 111 toward the samples in the current frame 117.

At block 240, the method 200 involves the prediction engine 120 determining a suggested graphical edit set 133 corresponding to the non-matching component set 114 from the previous graphical edit set 112, that is modified based on the deformed samples. For instance, the prediction engine 120 recommends the deformed non-matching component set 114-1 as the suggested graphical edit set 133 for the current frame 117. For example, the prediction engine 120 identified a matching component set 113 and a non-matching component set 114 of the previous graphical edit set 112 based on a correspondence to the executed graphical edit set 118 in the current frame and deformed samples representing the previous graphical edit set 112 (including the matching component set 113 and the non-matching component set 114) toward samples representing the executed graphical edit set 118 in the current frame 117 using the deformation model. In this example, the prediction engine 120 identifies samples representing the deformed non-matching component set 114-1 from the deformed previous graphical edit set 112-1. In this example, the prediction engine 120 determines the suggested graphical edit set 133 from the samples representing the deformed non-matching component set 114-1. In certain examples, the suggested graphical edit set 133 is a set of brush stroke operations to augment the executed graphical edit set 118 in the current frame 117. In some examples, the suggested graphical edit set 133 includes a set of brush stroke operations in a particular order (e.g., a suggested brush stroke series). The prediction engine 120 provides the suggested graphical edit set 133 to the sculpting application 102.

In certain examples, instead of providing a suggested graphical edit set 133 from the input frame data 110 including the previous graphical edit set 112 of a previous frame 111 and an executed graphical edit set 118 of a current frame 117, the prediction engine 120 provides a suggested manipulation operation set from input frame data 110 that includes a previous manipulation operation set of a previous frame 111 and an executed manipulation operation set of a current frame 117. In certain examples, the prediction engine 120 provides both a suggested graphical edit set 133 and a suggested manipulation operation set.

At block 250, the method 200 involves the sculpting application 102 updating an interface to provide the suggested graphical edit set 133 for augmenting the executed graphical edit set 118 in the current frame 117. For instance, the sculpting application 102 displays, via the user interface 103 of the presentation computing device 101, a description of the suggested graphical edit set 133 and a request for an input to approve the suggested graphical edit set 133. In certain examples, the sculpting application 102 displays, in the current frame 117, paths of brush strokes in the suggested graphical edit set 133, an indication of a brush stroke tool associated with the suggested graphical edit set 133, or other information associated with the suggested graphical edit set 133. In certain examples, the sculpting application 102 displays a preview of the mesh object in the current frame 117 that represents an appearance of the mesh object if the sculpting application 102 applies the suggested graphical edit set 133 in the current frame 117. The sculpting application 102 applies the suggested graphical edit set 133 to the mesh object in the current frame 117 responsive to receiving an input approving the suggested graphical edit set 133. In some examples, the sculpting application 102 does not apply the suggested graphical edit set 133 to the mesh object in the current frame 117 if the sculpting application 102 does not receive the input approving the suggested graphical edit set 133.

FIG. 3 depicts an example of a method for identifying, from a comparison of samples, a matching component set 113 from a previous graphical edit set 112 that corresponds to an executed graphical edit set 118, according to certain embodiments. The method for implementing block 220 is described with reference to the components illustrated in FIG. 1, although other implementations are possible. For example, the program code for the prediction engine 120, which is stored in a non-transitory computer-readable medium, is executed by one or more processing devices to cause the prediction engine 120 to perform one or more operations described herein.

The method for implementing block 220 describes how to identify the matching component set 113 and the non-matching component set 114. In the embodiments described herein, the prediction engine 120 determines the suggested graphical edit set 133 from the deformed non-matching component set 114-1. The method for implementing block 220 involves determining correspondences between samples representing the previous graphical edit set 112 in the previous frame 111 and samples representing the executed graphical edit set 118 in the current frame 117 using a global similarity measurement. The global similarity measurement compares samples using global sample neighborhoods that compare samples for both spatial and temporal similarity.

At block 310, the method for implementing block 220 involves the prediction engine 120 determining a local sample neighborhood for each sample. For instance, the prediction engine 120 generates a set of samples representing the previous graphical edit set 112 in the previous frame 111 and a set of samples representing the executed graphical edit set 118 in the current frame 117. The prediction engine 120 determines a local sample neighborhood for each sample representing the previous graphical edit set 112 that describes the sample with respect to other samples within a spatial vicinity to the sample in the previous frame 111. The prediction engine 120 determines a local sample neighborhood for each sample representing the executed graphical edit set 118 that describes the sample with respect to other samples within a spatial vicinity to the sample in the current frame 117. In certain examples, the prediction engine 120 determines a local sample neighborhood of a sample to include a predefined number of other samples nearest to the sample in the same frame. In other examples, the prediction engine 120 determines the local sample neighborhood of the sample to include other samples within a predefined proximity to the local sample in the same frame. An example of determining a global sample neighborhood is described in further detail in FIG. 5.

At block 320, the method for implementing block 220 involves determining a global sample neighborhood for each sample. The global sample neighborhood for a sample includes an accumulation of the local sample neighborhood of the sample and local sample neighborhoods of other samples that temporally precede the sample and represent a common brush stroke operation with the sample. An example of determining a global sample neighborhood is described in further detail in FIG. 5.

At block 330, the method for implementing block 220 involves computing a global similarity of each sample in the executed graphical edit set 118 to each sample in the previous graphical edit set 112 by comparing sample neighborhoods. The prediction engine 120 determines, for each sample, similarity differentials comparing the sample to each of the other samples of the local sample neighborhood of the sample. In certain examples, the prediction engine 120 determines a set of sample differentials $\hat{u}(s_a, s_b)$ between pairs of samples $s_a$ and $s_b$, as follows:

$$\hat{u}(s_a,s_b) = (\omega_p \hat{p}(s_a,s_b), \omega_a \hat{a}(s_a,s_b), \omega_t \hat{t}(s_a,s_b), \omega_m \hat{m}(s_a,s_b)) \quad \text{(Equation 13)}$$

where $\hat{p}(s_a,s_b)$, $\hat{a}(s_a,s_b)$, $\hat{t}(s_a,s_b)$, and $\hat{m}(s_a,s_b)$ represent differentials between samples $s_a$, and $s_b$ with respect to position p, appearance parameters a, temporal parameters t, and the local deformation across frames m, as described previously in equation (1) and block 220. The prediction engine 120 determines the positional sample differential $\hat{p}(s_a,s_b)$ by determining a difference between local positions of the samples $s_a$, and $s_b$ within their respective frames determined from parameterized representations of the samples that indicate a coordinate position of the sample within the respective frame. The prediction engine 120 determines the appearance parameter sample differential $\hat{a}(s_a,s_b)$, the temporal parameter sample differential $\hat{t}(s_a,s_b)$, and the local deformational sample differential $\hat{m}(s_a,s_b)$ by determining a direct numerical difference (e.g., a scalar or vector difference) between respective parameter values of each of the pair of samples. The prediction engine 120 determines weights $\omega_p$, $\omega_a$, $\omega_t$, $\omega_m$ associated with the differentials during optimization of the deformation model as described in block 240. In certain examples, the prediction engine 120 sets the weight $\omega_t$ associated with the temporal parameter differential $\hat{t}(s_a,s_b)$ to a predefined value (e.g., a value of ten) when the pair of samples represents the same brush stroke operation and to zero if the pair of samples does not represent the same brush stroke operation. For instance, the prediction engine 120 disregards the temporal parameter differential when comparing a pair of samples that does not belong to the same brush stroke operation. In certain examples, the prediction engine 120 sets the weights $\omega_a$, $\omega_t$, and $\omega_m$, associated with the appearance parameter sample differential $\hat{a}(s_a,s_b)$, the temporal parameter sample differential $\hat{t}(s_a,s_b)$, and the local deformational sample differential $\hat{m}(s_a,s_b)$, respectively, to predefined values (e.g., a value of one).

The prediction engine 120 determines a local neighborhood similarity comparing each of the samples representing the previous graphical edit set 112 in the previous frame 111 to each of the samples representing the executed graphical edit set 118 in the current frame 117. For instance, the prediction engine 120 determines a local neighborhood similarity between a pair of samples across frames (e.g., one sample from the previous frame 111 representing the previous graphical edit set 112 compared to a sample from the current frame 117 representing the executed graphical edit set 118), as follows:

$$\Delta(s', s) = \sum_{s_j \in n(s)} \exp\left(-|\hat{u}(s'_j, s') - \hat{u}(s_j, s)|^2\right) \quad \text{(Equation 14)}$$

where $s_j$ iterates for each sample in the local sample neighborhood $n(s)$ of the current frame 117 for sample s of the pair of samples and $s'_j$ iterates for each sample in the local sample neighborhood $n'(s)$ of the previous frame 111 for sample s' of the pair of samples. In certain embodiments, the prediction engine 120 determines pairings of samples of the previous frame 111 representing the previous graphical edit set 112 with samples of the current frame 117 representing the current graphical edit set 118 (e.g., pairings of $s'_j$ with $s_j$) by (1) identifying a pair of samples across frames for which the prediction engine 120 calculates a greatest similarity $\Delta(s', s)$, (2) excluding the pair of samples from further consideration, and (3) repeating steps (1) and (2) until $n(s)$ has no samples remaining for consideration.

The prediction engine 120 determines a global neighborhood similarity comparing each of the samples representing the previous graphical edit set 112 in the previous frame 111 to each of the samples representing the executed graphical edit set 118 in the current frame 117 using the determined local neighborhood similarities. For instance, the local sample neighborhood similarity determined using equation (14) spatially compares individual samples across frames based on local sample neighborhoods of samples. To determine a global neighborhood similarity, the prediction engine 120 accumulates a local neighborhood similarity of the pair of samples and predecessor samples representing the same brush stroke operation as the samples in the pair of samples. For instance, to measure global neighborhood similarity between a sample s' of the previous frame 111 and a sample s of the current frame 117, the prediction engine 120 accumulates the local sample neighborhood similarities of their predecessor samples $\upsilon(s')$ and $\upsilon(s)$, respectively, as follows:

$$\Upsilon(s', s) = \sum_{s_\upsilon \in \upsilon(s)} \Delta(s'_\upsilon, s_\upsilon) \quad \text{(Equation 15)}$$

where $s_\upsilon$ is determined backward temporally and diffuses from the sample s towards a nearby predecessor sample for all predecessor samples $\upsilon(s)$, and the predecessor sample $s'_\upsilon$ for all predecessor samples $\upsilon(s')$ of the previous frame 111 represents a matching predecessor sample to the predecessor sample $\upsilon(s)$ in the current frame 117 with the same relative diffusion depth. In certain embodiments, the prediction engine 120, to prevent predecessor samples υ'(s) of the previous frame 111 from running out of samples before the predecessor samples υ(s) of the current frame 117, sets the diffusion length to be a smaller between vυ(s)υ and ||υ'(s)||.

At block 340, the method for implementing block 220 involves identifying a matching component set 113 of the previous graphical edit set 112 that is similar to the executed graphical edit set 118 based on computed global similarities. The prediction engine 120 determines sample pairs across frames (e.g., pairs of samples where one sample in the previous frame 111 corresponds to a sample in the current frame 117). For each sample s in the current frame 117, the prediction engine 120 computes a global similarity Y(s', s) with each sample s' in the previous frame 111 of the same brush stroke operation type as the sample s. In certain examples, the prediction engine 120 normalizes the computed global similarities by dividing each global similarity by a sum of the global similarities so that each normalized global similarity is in a range of zero to one without being affected by the diffusion depth. The prediction engine 120 determines candidate matching samples s' in the previous frame 111 for a samples of the current frame 117, including (1) a samples' that has a largest global similarity when compared to the sample s of the current frame 117 and (2) samples s' that have global similarity values that are greater than a predefined threshold global similarity value (e.g., 35% of the largest global similarity value) when compared to the sample s of the current frame 117. The prediction engine 120 determines the matching sample $s_i^{K-1}$ of the previous frame 111 for each sample $s_i^K$ in the current frame 117 as follows:

$$s_i^K = arg\, max(\sigma(s_i^{K-1}, s))  \quad \text{(Equation 16)}$$

where for each sample s in the current frame 117, the respective sample $s_i^K$ the current frame 117 corresponds to a selected matching sample $s_i^{K-1}$ in the previous frame 111 of the set of candidate matching samples s' having the greatest global similarity value when compared with the sample $s_i^K$ in the current frame 117. The prediction engine 120 determines a matching component set of samples of the previous frame 111 from the matching samples s' in the previous frame 111 that correspond to each of the samples s in the current frame 117. The prediction engine 120 determines a non-matching component set of samples that includes all samples of the previous frame 111 that are not in the matching component set of samples. The matching component set of samples represents the matching component set 113 of the previous graphical edit set 112 of the previous frame 111. The non-matching component set of samples represents the non-matching component graphical edit set 114 of the previous graphical edit set 112 of the previous frame 111.

In certain embodiments, each time the sculpting application 102 receives a new brush stroke input in the current frame 117 that adds to the executed graphical edit set 118, the prediction engine 120 analyzes the global similarity between the executed graphical edit set 118 (represented by samples) and the previous graphical edit set 112 (represented by samples) to identify a matching component set 113 and a non-matching component set 114 of the previous graphical edit set 112. In certain examples, a quality of the identification of the matching component set 113 improves as more brush stroke inputs are received via the sculpting application 102 and added to the executed graphical edit set 118 in the current frame 117.

FIG. 4 depicts an illustration of a local sample neighborhood of a sample of a graphical edit set, according to certain embodiments described in the present disclosure. FIG. 4 depicts brush strokes applied to a mesh object in a frame represented by samples 400. As illustrated in FIG. 4, brush stroke operations $b_1'$, $b_2'$, and $b_3'$ are applied to a mesh surface 101 in a frame. In this example, the prediction engine 120 determines samples representing the brush strokes, where samples $s_1'$, $s_2'$, and $s_3'$ represent brush stroke $b_1'$; samples $s_4'$, $s_5'$, $s_6'$, and $s_7'$ represent brush stroke $b_2'$; and samples $s_8'$, $s_9'$, $s_{10}'$, $s_{11}'$, and $s_{12}'$ represent brush stroke $b_3'$. The prediction engine 120 determines the local sample neighborhood 402 of sample $s_6'$ to include spatially proximate samples $s_3'$, $s_5'$, $s_7'$, and $s_{10}'$. In one example, the prediction engine 120 determines that a local sample neighborhood 402 for a sample is preconfigured to include a preconfigured number (e.g., four) of the closest neighboring samples to the sample. In this example, the prediction engine 120 selects samples $s_3'$, $s_5'$, $s_7'$, and $s_{10}'$ as being the four closest neighboring samples to sample $s_6'$. For instance, the prediction engine 120 computes a distance between the sample $s_6'$ and each of the other neighboring samples in the frame ($s_1'$, $s_2'$, $s_3'$, $s_4'$, $s_5'$, $s_7'$, $s_8'$, $s_9'$, $s_{10}'$, $s_{11}'$, and $s_{12}'$) using positional information associated with each of the samples in the frame, ranking the other samples from closest to farthest away from the sample $s_6'$ using the computed distances, and selecting $s_3'$, $s_5'$, $s_7'$, and $s_{10}'$ as the four closet neighboring samples in the ranking. In another example, the prediction engine 120 determines that a local sample neighborhood for a sample is preconfigured to include all neighboring samples within a predefined distance from the sample.

FIG. 5 depicts an illustration of a global sample neighborhood of a sample of a graphical edit set determined by combining local sample neighborhoods of predecessor samples of the graphical edit set determined as illustrated in FIG. 4, according to certain embodiments described in the present disclosure. As illustrated in FIG. 5, brush strokes $b_1'$, $b_2'$, and $b_3'$ are applied to a mesh surface 401 in a frame. In this example, the prediction engine 120 determines samples representing brush strokes $b_1'$, $b_2'$, and $b_3'$, where samples $s_1'$, $s_2'$, and $s_3'$ represent brush stroke $b_1'$; samples $s_4'$, $s_5'$, $s_6'$, and $s_7'$ represent brush stroke $b_2'$; and samples $s_8'$, $s_9'$, $s_{10}'$, $s_{11}'$, and $s_{12}'$ represent brush stroke $b_3'$. In this example, brush stroke $b_1'$ temporally precedes brush stroke $b_2'$ and brush stroke $b_2'$ temporally precedes brush stroke $b_3'$. Accordingly, sample $s_1'$ temporally precedes sample $s_2'$, which temporally precedes samples $s_3'$, which temporally precedes sample $s_4'$, etc., where sample $s_{12}'$ is the final sample in the frame. In this example, the prediction engine 120 determines a global sample neighborhood 510 for sample $s_3'$, the subject sample 503, by (1) determining that predecessor sample 501 (sample $s_1'$) and predecessor sample 502 (sample $s_2'$) temporally precede the subject sample 503 in the same brush stroke $b_3'$, (2) determining local sample neighborhoods 511 and 512 for the predecessor samples 501 and 502 and a local sample neighborhood 513 for the subject sample 503 using the methods illustrated in FIG. 4, and (3) accumulating the local sample neighborhoods 511, 512, and 513 to determine the global sample neighborhood 510 of the subject sample 503, as illustrated in FIG. 5. As shown in FIG. 5, the global sample neighborhood only includes the accumulation of local sample neighborhoods 513 of the subject sample 504 and 511-512 of the predecessor samples 501-502 on the same brush stroke b1' and does not include any local sample neighborhoods of samples in the frame because each of the other samples in the frame does not satisfy the two conditions of (1) corresponding to the same brush stroke as the sample $s_3'$ and (2) temporally preceding the sample $s_3'$.

FIG. 6 depicts an illustration of determining a component graphical edit set in a previous frame that matches an executed graphical edit set in a current frame as in FIG. 3, using global sample neighborhoods as illustrated in FIG. 5 as a basis of comparison, according to certain embodiments described in the present disclosure. FIG. 6 depicts a previous set of brush strokes $b_1'$ (represented by samples $s_1'$, $s_2'$, $s_3'$), $b_2'$ (represented by samples $s_4'$ and $s_5'$), $b_3'$ (represented by samples $s_6'$ and $s_7'$), $b_4'$ (represented by samples $s_8'$ and $s_9'$), (represented by samples $s_{10}'$, $s_{11}'$, and $s_{12}'$), and $b_6'$ (represented by samples $b_{13}'$ and $b_{14}'$) executed in a previous frame 601 and an executed set of brush strokes $b_1$ (represented by samples $s_1$, $s_2$, and $s_3$), $b_2$ (represented by samples $s_4$ and $s_5$), and $b_3$ (represented by samples $s_6$ and $s_7$) executed in a current frame 602. In an example, the prediction engine 120 determines the samples representing the brush strokes in the previous frame 601 and the current frame 602. In this example, the prediction engine 120 determines global similarity values comparing each of the samples of the current frame 602 to each of the samples in the previous frame 601 to identify the matching component set 604 (including samples of the previous frame 601 representing brush strokes $b_1'$, $b_2'$, and $b_4'$) and the non-matching component set 606 (including the samples of the previous frame 601 representing brush strokes $b_3'$, $b_5'$, and $b_6'$) according to methods described herein in FIG. 3. FIG. 6 illustrates a comparison (shown using dashed lines) of global sample neighborhoods 605-2 of the samples of the matching component set 604 of the previous frame 601 with global sample neighborhoods 605-1 of the samples of the executed graphical edit set 603 of the current frame 602. FIG. 6 further illustrates a suggested graphical edit set 607. In an example, the prediction engine 120 determines the suggested graphical edit set by identifying samples representing the non-matching component set 606 (brush strokes $b_3'$, $b_5'$, and $b_6'$) in the previous frame 601, deforming the samples of the previous frame toward samples of the current frame 602, identifying the deformed samples representing the non-matching component set 606, and generating the suggested graphical edit set 607 from the deformed samples representing the non-matching component set 606 in the current frame 602. In this example, the prediction engine 120 provides a useful suggested graphical edit set 607 for the current frame 602 even though the executed graphical edit set includes brush strokes executed in a different order than in the previous frame 601. For instance, brush stroke $b_2$ in the current frame 602 is similar to brush stroke $b_4'$ of the previous frame 601 and brush stroke $b_3$ of the current frame 602 is similar to brush stroke $b_2'$ of the previous frame 601. Accordingly, because the global similarity neighborhood provides a basis for comparison of both spatial and temporal similarity within brush strokes, the prediction engine 120 successfully identifies the correspondence between the matching component set 604 and the executed graphical edit set 606 even though the executed graphical edit set 606 of the current frame 602 includes brush strokes executed in a different order than brush strokes in the previous frame. For instance, stroke $b_4'$ is the fourth brush stroke of the previous frame 601 and brush stroke $b_6'$ is the sixth brush stroke executed in the current frame 602.

Example of a Computing System for Implementing Certain Embodiments

Figure 7:
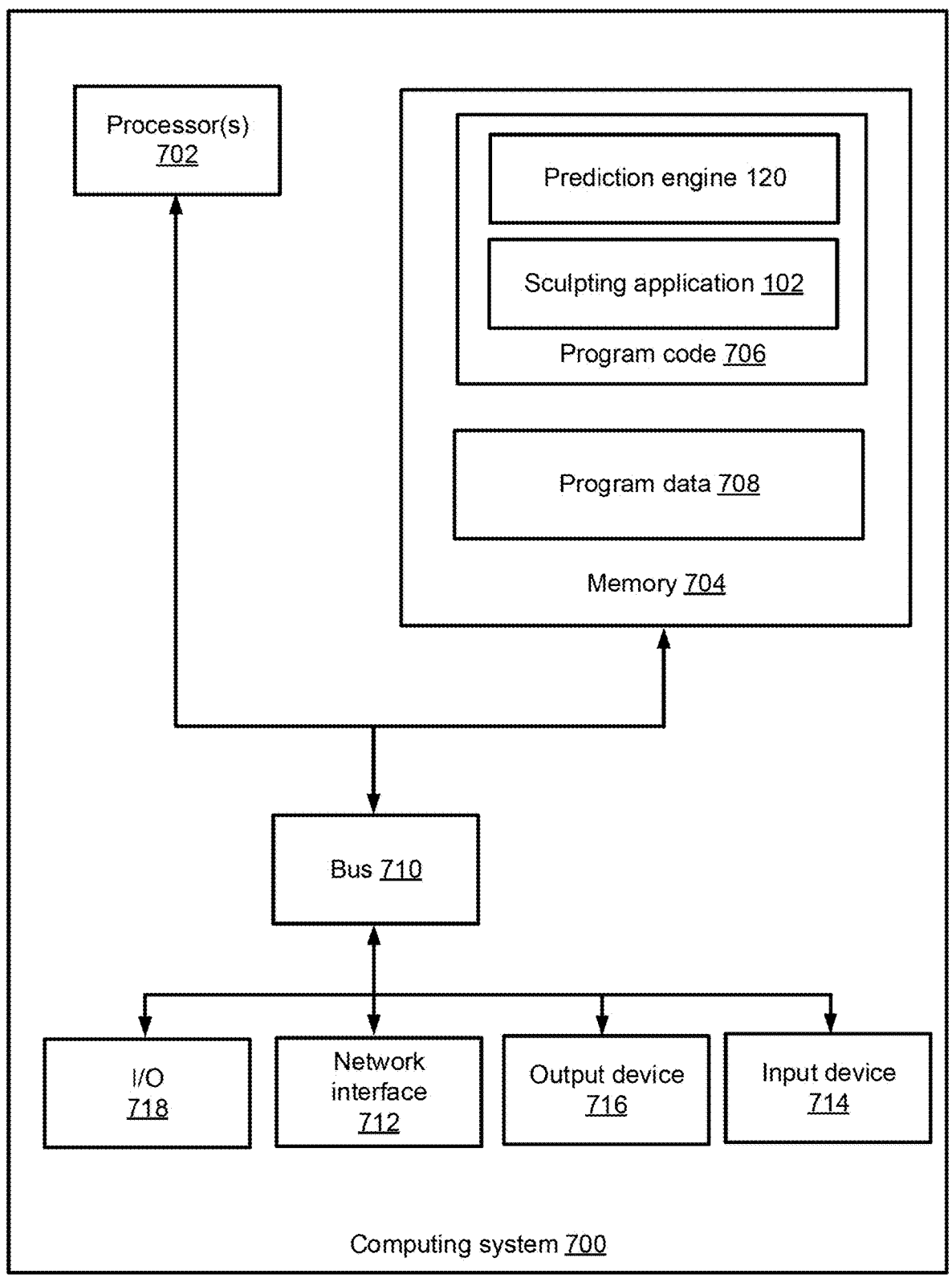
FIG. 7 depicts an example of a computing system that performs certain operations described herein, according to certain embodiments described in the present disclosure.

Any suitable computing system or group of computing systems is used for performing the operations described herein. For example, FIG. 7 depicts an example of a computing system 700. The computing system 700 includes the prediction engine 120 and the sculpting application 102.

The depicted examples of a computing system 700 include one or more processors 702 communicatively coupled to one or more memory devices 704. The processor 702 executes computer-executable program code stored in a memory device 704, accesses information stored in the memory device 704, or both. Examples of the processor 702 include a microprocessor, an application-specific integrated circuit (ASIC), a field-programmable gate array (FPGA), or any other suitable processing device. The processor 702 includes any number of processing devices, including a single processing device.

The memory device 704 includes any suitable non-transitory computer-readable medium for storing data, program code, or both. A computer-readable medium includes any electronic, optical, magnetic, or other storage device capable of providing a processor with computer-readable instructions or other program code. Non-limiting examples of a computer-readable medium include a magnetic disk, a memory chip, a read-only memory (ROM), a random access memory (RAM), an ASIC, optical storage, magnetic tape or other magnetic storage, or any other medium from which a processing device reads instructions.

The computing system 700 executes program code 706 that configures the processor 302 to perform one or more of the operations described herein. The program code 706 includes, for example, the prediction engine 120, the sculpting application 102, or other suitable applications that perform one or more operations described herein. The program code 706 is resident in the memory device 704 or any suitable computer-readable medium and is executed by the processor 702 or any other suitable processor. The program code includes processor-specific instructions generated by a compiler or an interpreter from code written in any suitable computer-programming language, including, for example, C, C++, C#, Visual Basic, Java, Python, Perl, JavaScript, and ActionScript.

In some embodiments, program code 706 for implementing the prediction engine 120 and the sculpting application 102 are stored in the memory device 704, as depicted in FIG. 6. In additional or alternative embodiments, program code 706 for the prediction engine 120 and/or the sculpting application 102 is stored in different memory devices of different computing systems. In additional or alternative embodiments, the program code 706 described above is stored in one or more other memory devices accessible via a data network.

The computing system 700 accesses program data 708, which includes one or more of the datasets described herein (e.g., the input frame data 110, the output frame data 130), in any suitable manner. In some embodiments, some or all of one or more of these datasets, models, and functions are stored as the program data 708 in the memory device 704, as in the example depicted in FIG. 7. In additional or alternative embodiments, one or more of these datasets, models, and functions are stored in the same memory device (e.g., one of the memory device 704). For example, a common computing system, such as the prediction engine 120 depicted in FIG. 1, includes hardware, software, or both that implements the prediction engine 120 and the sculpting application 102. In additional or alternative embodiments, one or more of the programs, datasets, models, and functions described herein are stored in one or more other memory devices accessible via a data network.

The computing system 700 also includes a network interface device 712. The network interface device 712 includes any device or group of devices suitable for establishing a wired or wireless data connection to one or more data networks. Non-limiting examples of the network interface device 712 include an Ethernet network adapter, a modem, and the like. The computing system 700 is able to communicate with one or more other computing devices (e.g., presentation computing device 101) via a data network using the network interface device 712.

The computing system 700 also includes a number of external or internal devices, such as input or output devices. For example, the computing system 700 is shown with one or more input/output (I/O) interfaces 718. An I/O interface 718 receives input from input devices or provides output to output devices. One or more buses 710 are also included in the computing system 700. The bus 710 communicatively couples one or more components to other components of the computing system 700.

In some embodiments, the computing system 700 also includes the input device 714 and the output device 716 depicted in FIG. 7. An input device 714 includes any device or group of devices suitable for receiving visual, auditory, or other suitable input that controls or affects the operations of the processor 702. Non-limiting examples of the input device 720 include a touchscreen, a mouse, a keyboard, a microphone, or a separate mobile computing device. An output device 716 includes any device or group of devices suitable for providing visual, auditory, or other suitable sensory output. Non-limiting examples of the output device 716 include a touchscreen, a monitor, a speaker, or a separate mobile computing device.

Although FIG. 7 depicts the input device 714 and the output device 716 as being local to the computing system 700 that executes the program code 706, other implementations are possible. For instance, in some embodiments, one or more of the input device 714 and the output device 716 include a remote client-computing device that communicates with the computing system 700 via the network interface device 712 using one or more data networks described herein. In some embodiments, the presentation computing device 101 comprises the output device 716 and/or the input device 714 and is communicatively coupled to the computing system 700 via the network interface device 712.

Figure 8:
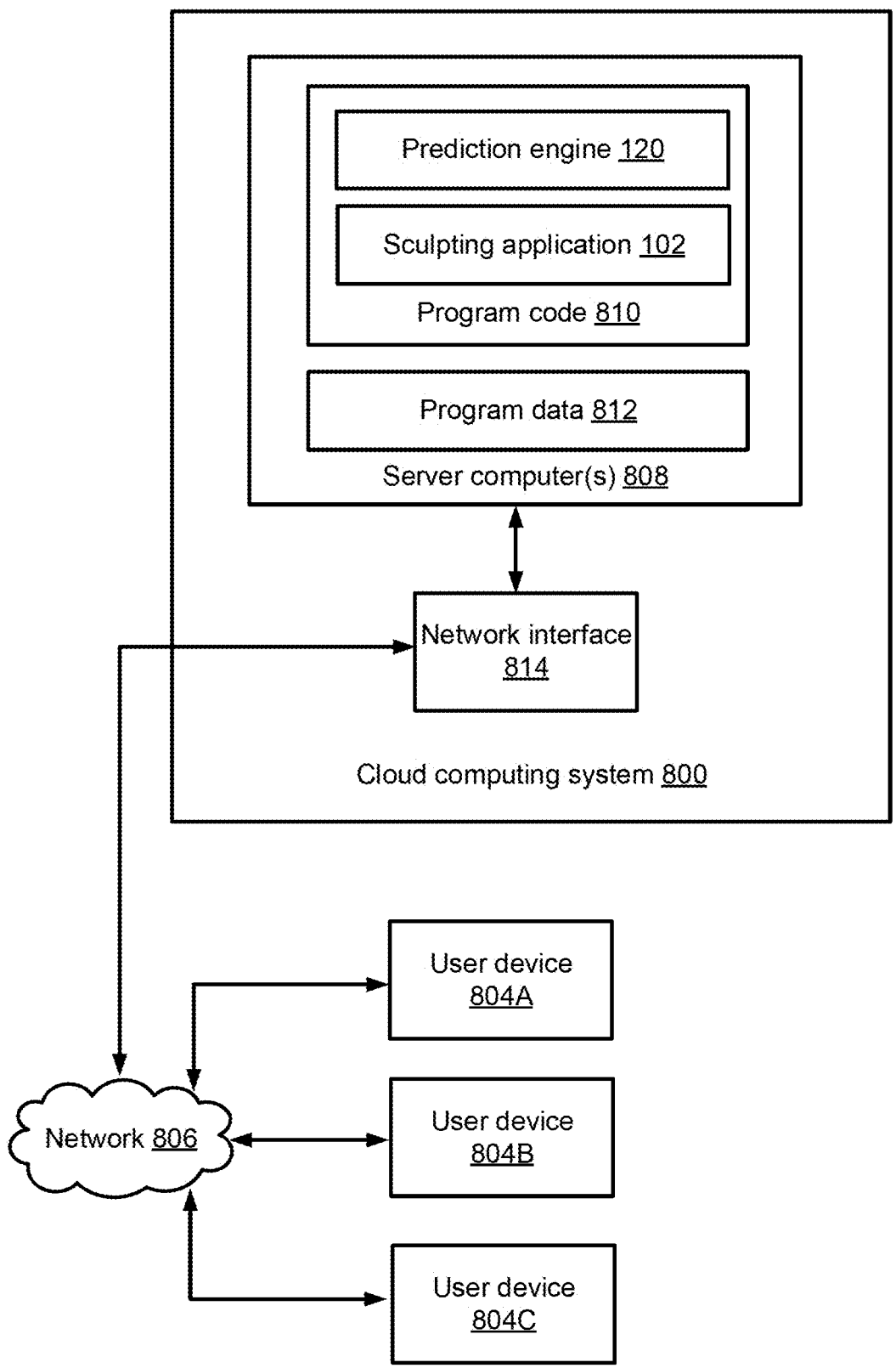
FIG. 8 depicts an example of a cloud-computing system that performs certain operations described herein, according to certain embodiments described in the present disclosure.

In some embodiments, the functionality provided by computer system 700 is offered as cloud services by a cloud service provider. For example, FIG. 8 depicts an example of a cloud computer system 800 offering the prediction engine 120 and the sculpting application 102 that is used by a number of user subscribers, including user subscribers using user devices 804A, 804B, and 804C across a data network 806. In the example, the prediction engine 120 and the sculpting application 102 are offered under a Software as a Service (SaaS) model. One or more users subscribe to a graphics editing service, and the cloud computer system 800 performs one or more functions of the prediction engine 120 and the sculpting application 102 for subscribers. For example, the cloud computer system 800 performs services including one or more of steps or functions illustrated in FIGS. 2-3 and described herein. The cloud computer system 800 includes one or more remote server computers 808.

The remote server computers 808 include any suitable non-transitory computer-readable medium for storing program code 810 (e.g., the prediction engine 120 and/or the sculpting application 102) and program data 812, or both, which is used by the cloud computer system 800 for providing the cloud services. A computer-readable medium includes any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device reads instructions. The instructions include processor-specific instructions generated by a compiler or an interpreter from code written in any suitable computer-programming language, including, for example, C, C++, C#, Visual Basic, Java, Python, Perl, JavaScript, and ActionScript. In various examples, the server computers 808 include volatile memory, non-volatile memory, or a combination thereof.

One or more of the server computers 808 execute the program code 810 that configures one or more processors of the server computers 808 to perform one or more of the operations that provide one or more methods described herein (e.g., the methods of FIGS. 2-3 described herein). As depicted in the embodiment in FIG. 8, the servers implement the prediction engine 120 and the sculpting application 102. Any other suitable systems or subsystems that perform one or more operations described herein (e.g., one or more development systems for configuring an interactive user interface) are also implemented by the cloud computer system 800.

In some embodiments, the cloud computer system 800 implements the services by executing program code and/or using program data 812, which is resident in a memory device of the server computers 808 or any suitable computer-readable medium and is executed by the processors of the server computers 808 or any other suitable processor.

In some embodiments, the program data 812 includes one or more datasets and models described herein. Examples of these datasets include training data. In some embodiments, one or more of datasets, models, and functions are stored in the same memory device. In additional or alternative embodiments, one or more of the programs, datasets, models, and functions described herein are stored in different memory devices accessible via the data network 806. The cloud computer system 800 also includes a network interface device 814 that enables communications to and from cloud computer system 800. In some embodiments, the network interface device 814 includes any device or group of devices suitable for establishing a wired or wireless data connection to the data networks 806.

Non-limiting examples of the network interface device 814 include an Ethernet network adapter, a modem, and/or the like. The graphics editing service is able to communicate with the user devices 804A, 804B, and 804C via the data network 806 using the network interface device 814.

General Considerations

Numerous specific details are set forth herein to provide a thorough understanding of the claimed subject matter. However, those skilled in the art will understand that the claimed subject matter may be practiced without these specific details. Other instances, methods, apparatuses, or systems that would be known by one of ordinary skill have not been described in detail so as not to obscure claimed subject matter.

Unless specifically stated otherwise, it is appreciated that throughout this specification, discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The examples of systems, methods, and acts described in the embodiments presented previously are illustrative, and, in alternative embodiments, certain acts can be performed in a different order, in parallel with one another, omitted entirely, and/or combined between different embodiments, and/or certain additional acts can be performed, without departing from the scope and spirit of various embodiments. Accordingly, such alternative embodiments are included within the scope of claimed embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be reordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action based on one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation and does not preclude the inclusion of such modifications, variations, and/or additions to the present subject matter as would be readily apparent to one of ordinary skill in the art.

The invention claimed is:

1. A method that includes performing, with one or more processing devices, operations comprising:
accessing first samples defining first positions along first paths of previous editing operations applied to a mesh object in a previous frame and second samples defining second positions along second paths of executed editing operations applied to the mesh object in a current frame;
identifying, from a comparison of the first samples and the second samples, a matching component set from the previous editing operations of the previous frame that corresponds to the executed editing operations of the current frame and a non-matching component set from the previous editing operations of the previous frame that does not correspond to the executed editing operations;
deforming, using a deformation model, the first samples toward the second samples;
determining suggested editing operations that comprise the non-matching component set as modified based on the deformed first samples; and
updating an interface to provide the suggested editing operations for augmenting the executed editing operations in the current frame.

2. The method of claim 1, further comprising optimizing the deformation model using a sculpting constraint such that starting samples of the previous editing operations proceed from the mesh object in the deformed first samples.

3. The method of claim 1, wherein the previous editing operations and the executed editing operations perform one or more of (a) interacting with a surface of the mesh object to change a shape of the mesh object and (b) transforming the mesh object.

4. The method of claim 1, wherein the previous editing operations and the executed editing operations comprise one of drag brush operations, clay brush operations, smooth brush operations, crease brush operations, flat brush operations, grab brush operations, translation operations, rotation operations, and scaling operations.

5. The method of claim 1, wherein each of the first samples and the second samples further comprises attributes information, including a local deformation across frames, appearance parameters, and temporal parameters associated with the respective sample.

6. The method of claim 1, further comprising:
for each of the first samples:
determining a first local sample neighborhood based on proximate first samples within a proximity to the first sample;
determining a first global sample neighborhood based on first local sample neighborhoods of preceding first samples temporally preceding the first sample in an editing operation proceeding from the mesh object; and
comparing the first global sample neighborhood against a second global sample neighborhood corresponding to each second sample to determine a correspondence probability,
wherein identifying the matching component set of the first set further comprises identifying a set of first samples having correspondence probabilities greater than a predefined correspondence probability.

7. A non-transitory computer-readable medium comprising computer-readable program instructions that, when executed by a computing device, cause the computing device to perform operations comprising:

accessing data identifying previous editing operations applied to a mesh object in a previous frame;

a step for generating, with a deformation model, suggested editing operations based on the previous editing operations;

optimizing the deformation model using a sculpting constraint such that suggested editing operations proceed from the mesh object; and updating an interface for an editing tool to provide the suggested editing operations for augmenting executed editing operations applied to the mesh object in a current frame.

8. The non-transitory computer-readable medium of claim 7, wherein starting samples of the suggested editing operations proceed from the mesh object.

9. The non-transitory computer-readable medium of claim 7, wherein the previous editing operations and the executed editing operations perform one or more of (a) interacting with a surface of the mesh object to change a shape of the mesh object and (b) transforming the mesh object.

10. The non-transitory computer-readable medium of claim 7, wherein the previous editing operations and the executed editing operations comprise one of drag brush operations, clay brush operations, smooth brush operations, crease brush operations, flat brush operations, grab brush operations, translation operations, rotation operations, and scaling operations.

11. The non-transitory computer-readable medium of claim 7, wherein the data identifying the previous editing operations comprises samples, wherein each sample includes an indication of a position, attributes information including a local deformation across frames, appearance parameters, and temporal parameters associated with the respective sample.

12. The non-transitory computer-readable medium of claim 7, wherein the step for generating, with the deformation model, the suggested editing operations based on the previous editing operations comprises:

determining first samples defining first positions along first paths of the previous editing operations in the previous frame and second samples defining second positions along second paths of the executed editing operations in the current frame;

identifying, from a comparison of the first samples and the second samples, a matching component set from the previous editing operations that corresponds to the executed editing operations, wherein the previous editing operations comprise the matching component set and a non-matching component set; and deforming, using a deformation model, the first samples toward the second samples, wherein the suggested editing operations comprise the non-matching component set as modified based on the deformed first samples.

13. The non-transitory computer-readable medium of claim 12, further comprising computer-readable program instructions that, when executed by the computing device, cause the computing device to perform operations comprising:

for each of the first samples:

determining a first local sample neighborhood based on proximate first samples within a proximity to the first sample;

determining a first global sample neighborhood based on first local sample neighborhoods of preceding first samples temporally preceding the first sample in a editing operation proceeding from the mesh object; and comparing the first global sample neighborhood against a second global sample neighborhood corresponding to each second sample to determine a correspondence probability;

wherein identifying the matching component set of the first set further comprises identifying a set of first samples having correspondence probabilities greater than a predefined correspondence probability.

14. A system, comprising:

processing hardware; and a non-transitory computer-readable medium communicatively coupled to the processing hardware, wherein the processing hardware is configured for executing instructions in the non-transitory computer-readable medium and thereby performing operations comprising:

accessing a first series of previous editing operations applied to a mesh object using a tool in a previous frame and a second series of executed editing operations applied to the mesh object using the tool in a current frame;

comparing a first representation of the first series to a second representation of the second series to identify a matching component series of the first series that corresponds to the second series and a non-matching component series of the first series that does not correspond to the second series;

deforming, using a deformation model, the first representation toward the second representation, wherein the deformation model is optimized using a sculpting constraint such that the previous editing operations using the tool proceed from the mesh object in the deformed first representation; and providing a third series of suggested editing operations using the tool to augment the second series in the current frame, the third series comprising the non-matching component of the first series in the deformed first representation.

15. The system of claim 14, wherein the first representation comprises first samples, wherein the second representation comprises second samples, and wherein deforming the first representation toward the second representation comprises deforming the first samples toward the second samples.

16. The system of claim 15, wherein the processing hardware is further configured for executing instructions in the non-transitory computer-readable medium and thereby further performing operations comprising:

for each of the first samples:

determining a first local sample neighborhood based on proximate first samples within a proximity to the first sample;

determining a first global sample neighborhood based on first local sample neighborhoods of preceding first samples temporally preceding the first sample in an editing operation proceeding from the mesh object; and comparing the first global sample neighborhood against a second global sample neighborhood corresponding to each second sample to determine a correspondence probability;

wherein identifying the matching component series of the first representation further comprises identifying a set of first samples having correspondence probabilities greater than a predefined correspondence probability.

17. The system of claim 15, wherein each of the first samples and the second samples further comprises attributes information, including a local deformation across frames, appearance parameters, and temporal parameters associated with the respective sample.

18. The system of claim 14, wherein the previous editing operations and the executed editing operations perform one or more of (a) interacting with a surface of the mesh object to change a shape of the mesh object and (b) transforming the mesh object.

19. The system of claim 14, wherein the tool comprises one of a drag brush tool, a clay brush tool, a smooth brush tool, a crease brush tool, a flat brush tool, a grab brush tool, a translation tool, a rotation tool, and a scaling tool.

20. The system of claim 14, wherein a first order of execution of the first series is different from a second order of execution of the second series.

\* \* \* \* \*